(12) United States Patent
Coyes et al.

(10) Patent No.: US 12,173,705 B2
(45) Date of Patent: Dec. 24, 2024

(54) APPARATUSES FOR ALTERING FLUID FLOW IN DOWNHOLE PUMPS AND RELATED ASSEMBLIES AND METHODS

(71) Applicant: Q2 Artificial Lift Services ULC, Red Deer (CA)

(72) Inventors: Corbin Coyes, Red Deer (CA); Jordy Quinn, Red Deer (CA)

(73) Assignee: Q2 Artifical Lift Services ULC, Red Deer (CA)

( * ) Notice: Subject to any disclaimer, the term of this patent is extended or adjusted under 35 U.S.C. 154(b) by 434 days.

(21) Appl. No.: 17/507,477

(22) Filed: Oct. 21, 2021

(65) Prior Publication Data
US 2022/0120158 A1   Apr. 21, 2022

Related U.S. Application Data

(60) Provisional application No. 63/094,387, filed on Oct. 21, 2020.

(51) Int. Cl.
| | |
|---|---|
| *F04B 53/22* | (2006.01) |
| *E21B 34/06* | (2006.01) |
| *F04B 47/02* | (2006.01) |
| *F04B 53/10* | (2006.01) |
| *F16K 27/02* | (2006.01) |

(52) U.S. Cl.
CPC .............. *F04B 53/22* (2013.01); *E21B 34/06* (2013.01); *F04B 47/02* (2013.01); *F04B 53/10* (2013.01); *F04B 53/1002* (2013.01); *F16K 27/0209* (2013.01); *E21B 2200/04* (2020.05)

(58) Field of Classification Search
CPC ...... F04B 53/22; F04B 53/10; F04B 53/1002; F04B 47/02; F16K 27/0245; F16K 27/0209; E21B 34/06
See application file for complete search history.

(56) References Cited

U.S. PATENT DOCUMENTS

| | | | | |
|---|---|---|---|---|
| 1,416,277 A | * | 5/1922 | Fuller | ..................... F04B 53/10 137/454.4 |
| 1,467,370 A | * | 9/1923 | Fuller | ..................... F04B 53/10 417/452 |

(Continued)

FOREIGN PATENT DOCUMENTS

CA         2915465 C      2/2023

OTHER PUBLICATIONS

Tru Lift Supply Inc. Sand Mover webpage accessed Nov. 18, 2020, 2 pages.

(Continued)

*Primary Examiner* — Jessica Cahill
(74) *Attorney, Agent, or Firm* — Smith Baluch LLP

(57) ABSTRACT

Apparatuses are provided for altering fluid flow in downhole pumps. In some embodiments, the apparatus comprises a body comprising: an inner core positioned at a longitudinal axis of the body, the inner core comprising an elongate element having an upper domed end and a lower domed end; and at least two fluid channels extending through the body, the at least two fluid channels spaced circumferentially around the elongate element. The apparatus may be used in combination with a ball check valve to improve the velocity profile of the fluid flowing around the valve ball. Related assemblies and methods are also provided.

20 Claims, 15 Drawing Sheets

(56) References Cited

U.S. PATENT DOCUMENTS

| | | | |
|---|---|---|---|
| 2,061,480 A * | 11/1936 | Pigott | E21B 34/06 |
| | | | 166/325 |
| 3,523,580 A * | 8/1970 | Lebourg | E21B 34/06 |
| | | | 73/40.5 R |
| 4,189,385 A * | 2/1980 | Greenspan | F16K 27/0209 |
| | | | 422/918 |
| 6,283,148 B1 * | 9/2001 | Spears | F16K 15/04 |
| | | | 251/126 |
| 7,069,997 B2 | 7/2006 | Coyes et al. | |
| 9,033,688 B2 | 5/2015 | Kowalchuk | |
| 9,890,780 B2 | 2/2018 | Kowalchuk | |
| D947,328 S | 3/2022 | Klatt | |
| 11,428,084 B2 | 8/2022 | Fraser et al. | |
| 11,608,709 B2 | 3/2023 | Pola et al. | |
| 11,913,555 B2 | 2/2024 | Quinn et al. | |
| 2010/0269928 A1 * | 10/2010 | Ford | F16K 27/0245 |
| | | | 137/533.19 |
| 2014/0373953 A1 * | 12/2014 | Spanevello | F16K 15/148 |
| | | | 137/859 |
| 2018/0291891 A1 * | 10/2018 | Scopelite | F04B 15/02 |
| 2020/0011154 A1 * | 1/2020 | Stachowiak, Jr. | E21B 34/142 |
| 2020/0208503 A1 | 7/2020 | Dyck et al. | |
| 2021/0246992 A1 * | 8/2021 | Ford | F16K 15/04 |
| 2021/0301621 A1 | 9/2021 | Pola et al. | |
| 2021/0381338 A1 | 12/2021 | Coyes et al. | |
| 2022/0090470 A1 | 3/2022 | Pugliese et al. | |
| 2022/0196007 A1 | 6/2022 | Narasimhan et al. | |
| 2024/0084792 A1 | 3/2024 | Pola et al. | |

OTHER PUBLICATIONS

White, "Fluid Mechanics 7th Edition in SI units." (2016), 1538 pages.

\* cited by examiner

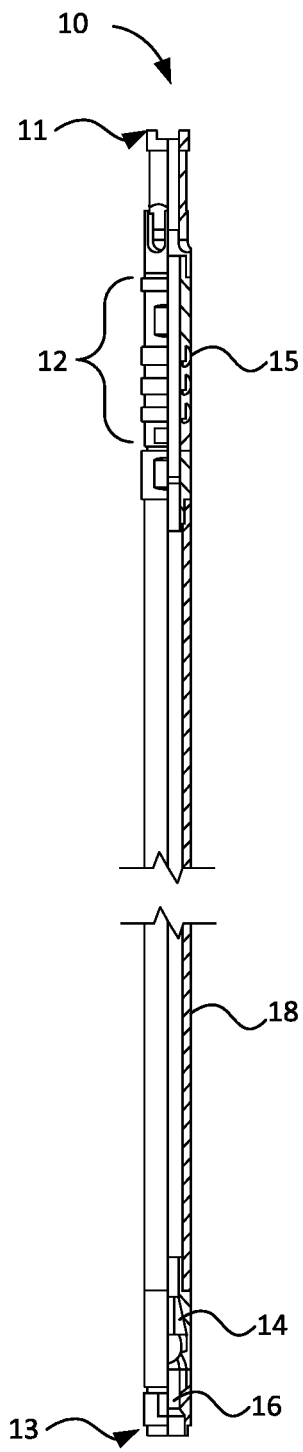
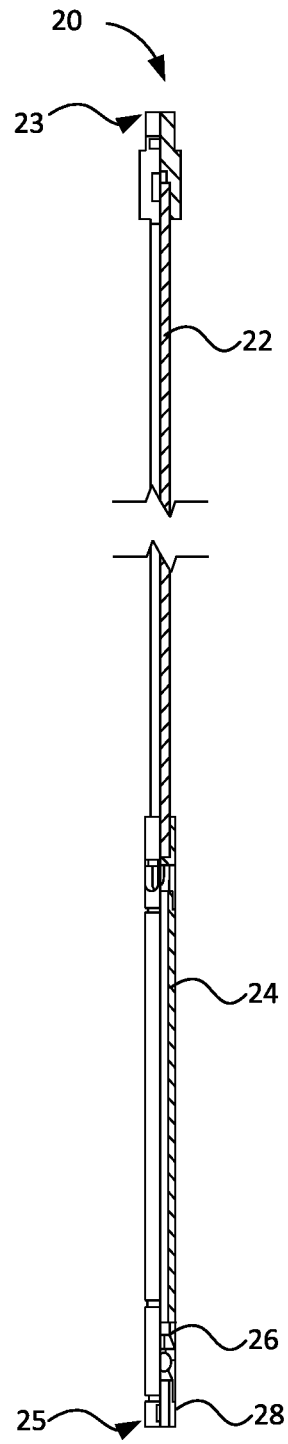
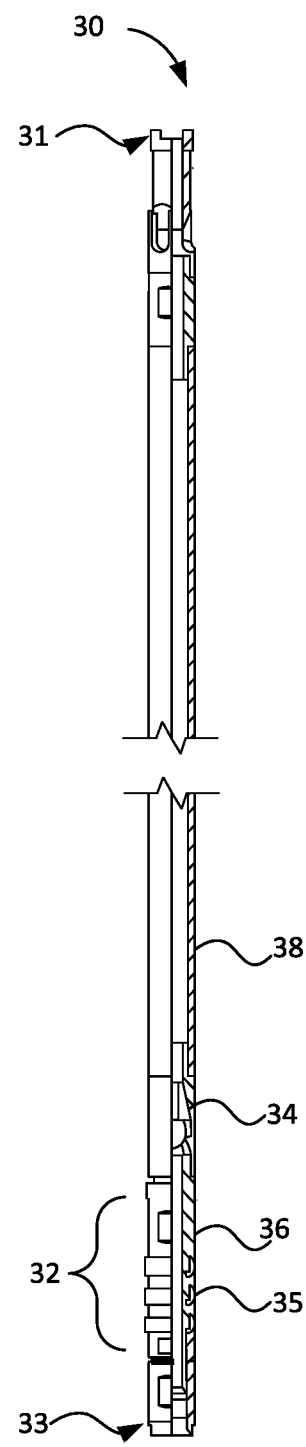
FIG. 1A
(Prior Art)
FIG. 1B
(Prior Art)
FIG. 1C
(Prior Art)

APPARATUSES FOR ALTERING FLUID FLOW IN DOWNHOLE PUMPS AND RELATED ASSEMBLIES AND METHODS

RELATED APPLICATION

The present disclosure claims priority to U.S. Provisional Patent Application No. 63/094,387, filed Oct. 21, 2020, the entire contents of which are incorporated herein by reference.

TECHNICAL FIELD

The present disclosure relates to artificial lift systems such as downhole pumps. More particularly, the present disclosure relates to apparatuses and related assemblies and methods for altering fluid flow in downhole reciprocating pumps.

BACKGROUND

In hydrocarbon recovery operations, an artificial lift system is typically used to recover fluids from a well in a subterranean earth formation. Common artificial lift systems include reciprocating pumps such as sucker rod pumps. The pump may generally comprise a plunger disposed within a barrel and a valve system including a standing valve and a traveling valve. The plunger is moved up and down within the barrel in order to draw fluids to the surface. More particularly, the plunger may be coupled to a lower end of a reciprocating rod (such as a valve rod) or rod string that is actuated by a pump jack or other surface equipment.

FIG. 1A shows an example barrel assembly 10 of a conventional "top cup hold-down" downhole pump. The barrel assembly 10 is positioned in a wellbore (not shown) and has an uphole end 11 and a downhole end 13. The barrel assembly 10 in this example comprises a barrel 18, a standing valve 14, and a hold-down assembly 12. The hold-down assembly 12 is positioned proximate the uphole end 11 and includes seating cups 15 to create a seal between the barrel assembly 10 and the tubing of the wellbore. The standing valve 14 is positioned proximate the downhole end 13 and is coupled to a seat or bushing 16 at its lower (downhole) end.

FIG. 1B shows a plunger and valve rod assembly 20 that may be combined with the barrel assembly 10 of FIG. 1A (or the barrel assembly 30 of FIG. 1C as discussed below) to form a downhole pump. The assembly 20 comprises a valve rod 22, a plunger 24, and a traveling valve 26. The assembly 20 has an uphole end 23 and a downhole end 25. The valve rod 22 is at the uphole end 23 and extends downward to the plunger 24. The traveling valve 26 positioned below the plunger 24 and may be coupled to a plug seat 28 at its lower (downhole) end. The valve rod 22, plunger 24, and the traveling valve 26 reciprocate together, as actuated by a pump jack or other surface equipment (not shown), to move fluids to the surface.

FIG. 1C shows an alternative barrel assembly 30 of a conventional "bottom cup hold-down" downhole pump. The barrel assembly 30 has an uphole end 31 and a downhole end 33. The barrel assembly 30 comprises a barrel 38, a standing valve 34, and a hold-down assembly 32. The hold-down assembly 32 is positioned proximate the downhole end 33 and comprises seating cups 35 and a mandrel 36. The standing valve 34 is positioned above the hold-down assembly 32 and a lower end of the standing valve 34 is coupled to the mandrel 36. The plunger and rod assembly 20 of FIG. 1B may be received into the barrel assembly 30 to move fluids to the surface.

The flow of fluids through the barrel assembly 10, 30 and the plunger and rod assembly 20 is regulated by the combination of the standing valve 14, 34 and the traveling valve 26. On the downstroke, pressure differentials close the standing valve 14, 34 and open the travelling valve 26. Fluids in the barrel 18, 38 thereby pass upward through the travelling valve 26 and plunger 24 during the downstroke. On the upstroke, reversed pressure differentials close the travelling valve 26 and open the standing valve 14, 34. Fluids above the travelling valve 26 may be moved upward by motion of the plunger 24, and fluids from the earth formation or reservoir may enter the barrel 18, 38 (below the plunger) via the standing valve 14, 34.

Typically, the standing valve and the travelling valve of a downhole pump are each a respective ball check valve. A ball check valve may comprise a ball in a flow cage that can move between a first position in which flow is blocked and a second position in which fluid may flow through the cage. Typically, in a flow blocking position, the valve ball sits on a ball seat (such as a ring) and blocks fluid flow through an opening in the ball seat.

When the valve ball within the flow cage is unseated, fluid will flow through the flow cage and pass through an annular space around the valve ball. The annular space around the valve ball represents the smallest cross-sectional area of the pump and is where most of the pressure drop within the pump occurs. As the fluid passes around the valve ball, it will experience a loss in kinetic energy. In addition, fluid flow forces through the flow cage may cause the valve ball to vibrate within the flow cage. Vibration and lateral motion of the valve ball can cause or accelerate wear of the flow cage and/or ball.

SUMMARY

In one aspect, there is provided an apparatus for a downhole pump, the apparatus comprising: a body having an uphole end and a downhole end, the body comprising: an outer circumferential wall; an inner core positioned at a longitudinal axis of the body, the inner core comprising an elongate element having an upper domed end and a lower domed end; and at least two fluid channels extending through the body between the elongate element and the outer circumferential wall, the at least two fluid channels spaced circumferentially around the elongate element.

In some embodiments, the at least two fluid channels comprise three fluid channels.

In some embodiments, each of the at least two fluid channels has an approximately obround horizontal cross-section.

In some embodiments, each of the at least two fluid channels comprises a respective upper opening and a respective lower opening, and wherein the respective upper opening is a fluid outlet and the respective lower opening is a fluid inlet.

In some embodiments, the respective lower opening is rotationally offset from the respective upper opening.

In some embodiments, each of the at least two fluid channels extends from the respective upper opening to the respective lower opening in an approximately helical path around the circumference of the elongate element.

In some embodiments, the upper domed end is approximately semi-elliptical in profile.

In some embodiments, the lower domed end is approximately semi-circular in profile.

In some embodiments, the upper domed end of the elongate element is the uphole end of the body.

In some embodiments, the body further comprises an upper chamber at the uphole end, and wherein the upper domed end of the elongate element is recessed within the upper chamber.

In some embodiments, the body further comprises a lower chamber at the downhole end, and wherein the lower domed end of the elongate element is recessed within the lower chamber.

In some embodiments, the lower chamber is approximately frusto-conical in shape.

In some embodiments, the body comprises an upper attachment section attachable to a flow cage of a valve.

In some embodiments, the body comprises a lower attachment section attachable to another downhole component.

In another aspect, there is provided an assembly for a downhole pump comprising: a valve comprising a flow cage, a valve ball, the valve ball received within the flow cage; and an embodiment of the apparatus disclosed herein.

In some embodiments, the apparatus is coupled to the flow cage.

In some embodiments, the valve further comprises a ball seat positioned below the valve ball within the flow cage, and wherein the body of the apparatus is partially received into the flow cage to abut the ball seat.

In another aspect, there is provided a method for altering fluid flow in a downhole pump, the method comprising: providing at least one assembly disclosed herein; and flowing fluid through the at least one assembly.

In some embodiments, providing the at least one assembly comprises providing a first assembly and a second assembly.

In some embodiments, the valve of the first assembly is a standing valve and the valve of the second assembly is a traveling valve.

Other aspects and features of the present disclosure will become apparent, to those ordinarily skilled in the art, upon review of the following description of the specific embodiments of the disclosure.

BRIEF DESCRIPTION OF THE DRAWINGS

Some aspects of the disclosure will now be described in greater detail with reference to the accompanying drawings. In the drawings:

FIG. 1A is a side, partial cross-sectional view of a prior art barrel assembly of a top cup hold-down downhole pump;

FIG. 1B is a side, partial cross-sectional view of a prior art plunger and valve rod assembly that may be used with the barrel assembly of FIG. 1A;

FIG. 1C is a side, partial cross-sectional view of a prior art barrel assembly of a bottom cup hold-down downhole pump;

DETAILED DESCRIPTION

Generally, the present disclosure provides an apparatus for altering the fluid flow in a downhole reciprocating pump. The apparatus may comprise a body having an uphole end and a downhole end, the body comprising: an outer circumferential wall; an inner core positioned at a longitudinal axis of the body, the inner core comprising an elongate element having an upper domed end and a lower domed end; and at least two fluid channels extending through the body between the elongate element and the outer circumferential wall, the at least two fluid channels spaced circumferentially around the elongate element. Related assemblies and methods are also provided.

As used herein the terms "a," "an," and "the" may include plural referents unless the context clearly dictates otherwise.

In this disclosure, the term "upward" may be used to refer to the "uphole" direction, where the "uphole" direction refers to the direction toward the surface in a well or borehole. The term "downward" may be used to refer to the "downhole" direction, where the "downhole" direction refers to the direction toward the bottom of the well or borehole (i.e. opposite to the uphole direction).

The term "downhole pump" refers to any pumping system positioned within a well or borehole for pumping fluids or other materials to the surface. The term "reciprocating downhole pump" refers to any pump system in which one or more components reciprocates within the well for moving fluids or other materials uphole, such as downhole pump comprising a reciprocating plunger in a barrel.

The term "standing valve" refers to a valve positioned at or near the bottom of the barrel or corresponding structure of the downhole pump. The term "traveling valve" refers to a valve that travels with the plunger or other reciprocating component of the downhole pump.

An example apparatus 100 for altering fluid flow in a downhole reciprocating pump will be described with reference to FIGS. 2 to 6. The apparatus 100 is configured for use with a traveling valve of a plunger assembly, as discussed in more detail below.

Figure 2:
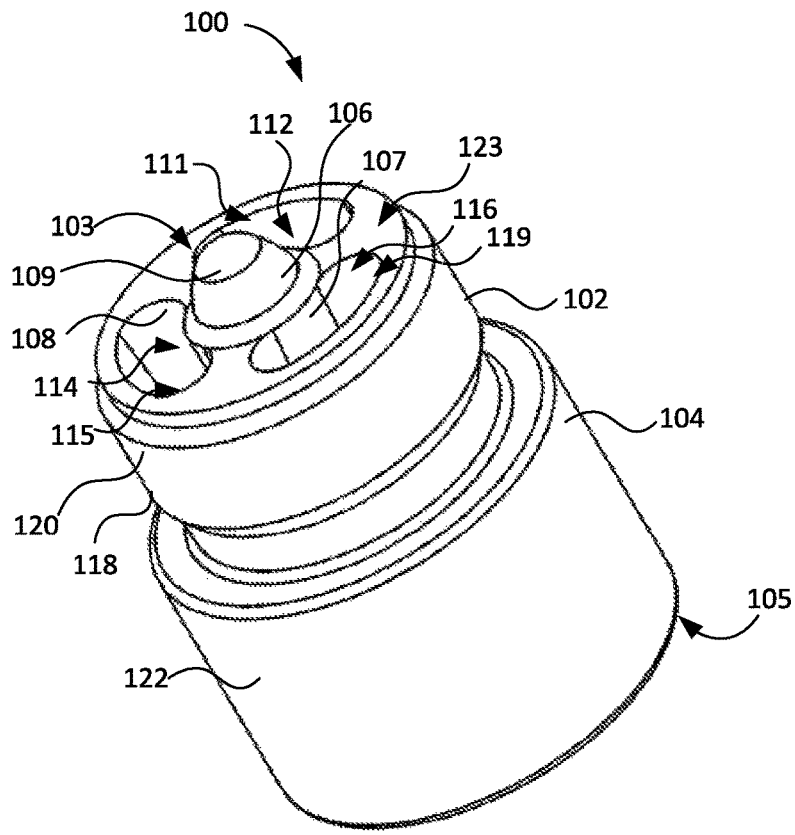
FIG. 2 is a perspective view of an example apparatus for altering fluid flow of a downhole pump, according to some embodiments.

As shown in FIG. 2, the apparatus 100 in this embodiment comprises a body 102 comprising an outer circumferential wall 104, an inner core 106, a connective portion 108, and at least two fluid channels extending through the body 102. The body 102 may be made of any suitable material including, but not limited to, stainless steel.

The body 102 has an uphole end 103 and a downhole end 105. The outer wall 104 of the body 102 may comprise an upper portion 118 and a lower portion 122. The upper portion 118 may comprise an upper attachment section 120 configured to engage the traveling valve of the plunger assembly, as discussed in more detail below. The lower portion 122 may be configured to be received into a barrel of the downhole pump. In some embodiments, the lower portion 122 has an outer diameter approximately the same as the outer diameter of the traveling valve of the plunger assembly.

Figure 6:
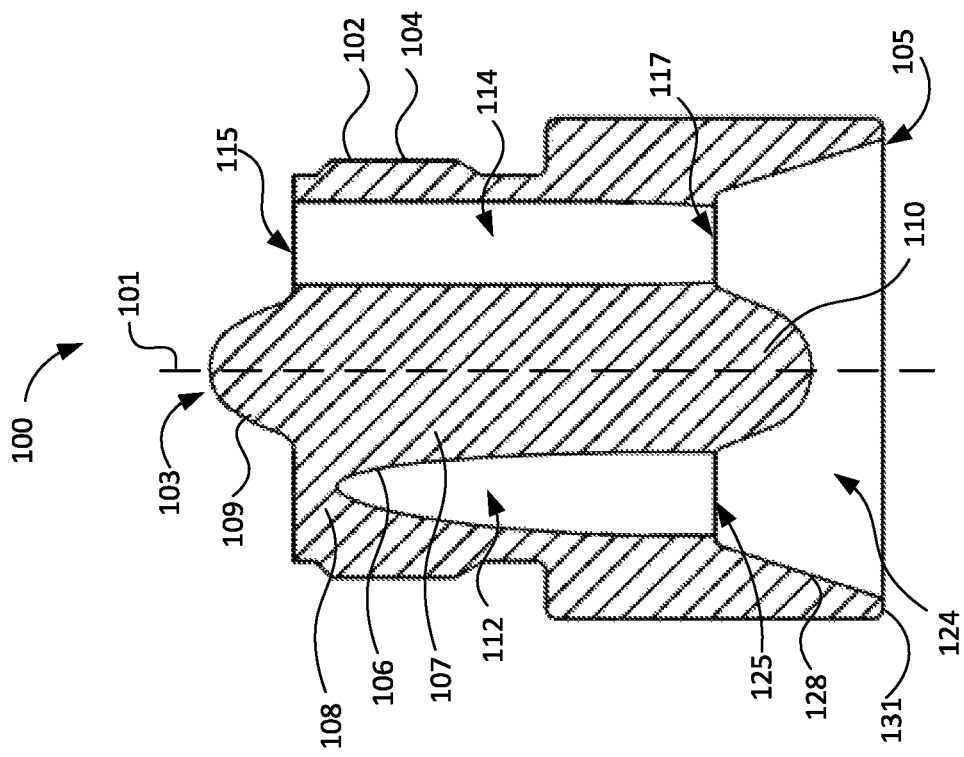
FIG. 6 is a cross-sectional view of the apparatus taken along the line A-A in FIG. 5.
Figure 5:
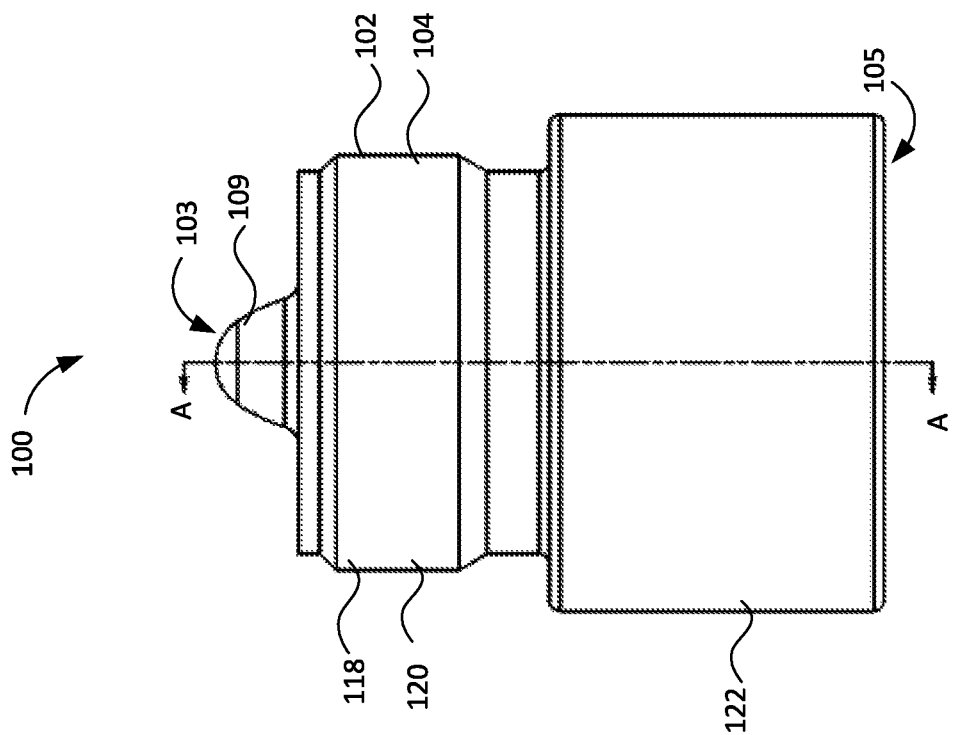
FIG. 5 is a side view of the apparatus of FIG. 2.

The inner core 106 may be positioned approximately at a longitudinal axis 101 of the body 102 (the longitudinal axis 101 is visible in FIG. 6). The inner core 106 may comprise an elongate element 107. In this embodiment, the elongate element 107 has an approximately obround-shaped profile. In other embodiments, the elongate element 107 may be any other suitable shape.

Figure 4:
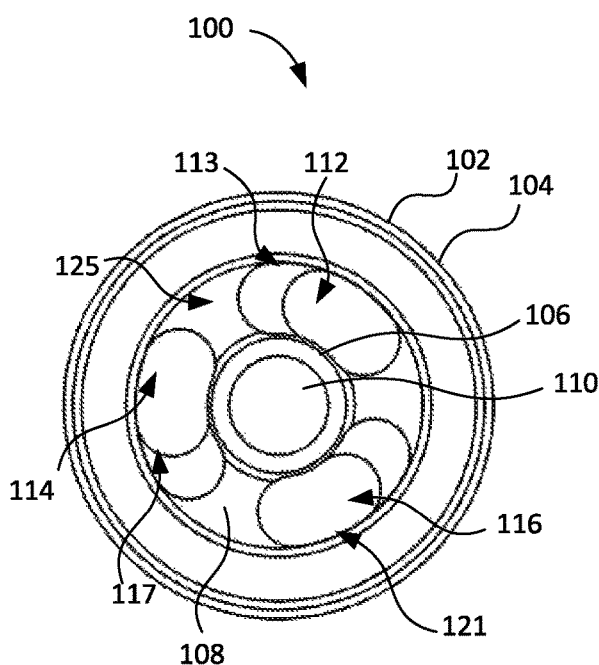
FIG. 4 is a bottom view of the apparatus of FIG. 2.

The elongate element 107 may comprise an upper domed end 109 and a lower domed end 110 (the lower domed end 110 is visible in FIGS. 4 and 6). As used herein, the term "domed" refers to any rounded or curved structure. In some embodiments, one or both of the upper and lower domed ends 109 and 110 are approximately semi-circular in profile or semi-elliptical in profile (with the major axis of the ellipse aligning with the longitudinal axis 101). In this embodiment, the upper domed end 109 is approximately semi-elliptical in profile, while the lower domed end 110 is approximately semi-circular. In other embodiments, each of the upper domed end 109 and the lower domed end 110 is any other suitable shape.

The connective portion 108 of the body 102 interconnects the elongate element 107 with the outer wall 104. The connective portion 108 has an upper face 123 (visible in FIGS. 2 and 3) and a lower face 125 (visible in FIGS. 4 and 6). In this embodiment, the upper face 123 of the connective portion 108 extends slightly above the upper portion 118 of the outer wall 104. The upper domed end 109 of the elongate element 107 extends upward from the upper face 123 of the connective portion 108 such that the upper domed end 109 is the uphole end 103 of the body 102. The lower face 125 of the connective portion 108 in this embodiment is recessed within the lower portion 122 and the lower domed end 110 extends downward from the lower face 125.

As shown in FIG. 6, the body 102 may further comprise a lower chamber 124 at the downhole end 105. The lower chamber 124 is defined by an inner face 128 of the body 102 and extends from the lower face 125 of the connective portion 108 to the downhole end 105 of the body 102. In some embodiments, the inner face 128 is angled with respect to the longitudinal axis 101 such that the lower chamber 124 is approximately frusto-conical in shape, with the lower domed end 110 in the centre. In other embodiments, the lower chamber 124 may be any other suitable shape and size. The outer wall 104 and the angled inner face 128 form a lower leading edge 131 at the downhole end 105 of the body 102.

Figure 3:
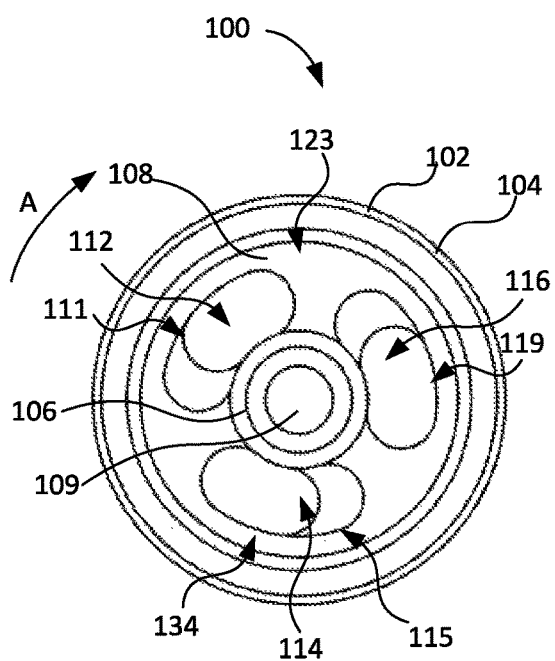
FIG. 3 is a top view of the apparatus of FIG. 2.

Referring to FIGS. 3 and 4, in this embodiment, the body 102 comprises three fluid channels extending through the connective portion 108: a first fluid channel 112, a second fluid channel 114, and a third fluid channel 116. Each fluid channel 112, 114, 116 may be rotationally offset from an adjacent fluid channel 112, 114, 116. The first, second, and third fluid channels 112, 114, and 116 may be spaced circumferentially around the elongate element 107.

In this embodiment, the first fluid channel 112 has an upper opening 111 and a lower opening 113, the second fluid channel 114 has an upper opening 115 and a lower opening 117, and the third fluid channel 116 has an upper opening 119 and a lower opening 121. The upper openings 111, 115, 119 may be defined by the upper face 123 of the connective portion 108 (visible in FIG. 3). The upper face 123 may comprise an annular upper surface 134 between the upper openings 111, 115, 119 and the outer wall 104. The lower openings 113, 117, 121 may be defined by the lower face 125 of the connective portion 108 (visible in FIG. 4). In this embodiment, each of the lower openings 113, 117, 121 is a fluid inlet and each of the upper openings 111, 115, 119 is a fluid outlet to allow fluid to flow into and out of the first, second, and third fluid channels 112, 114, and 116, respectively.

The structure of the first, second, and third fluid channels 112, 114, 116 will be discussed using the first fluid channel 112 as an example. The first fluid channel 112 extends from the upper opening 111 generally axially downwards to the lower opening 113. In this embodiment, the first fluid channel 112 extends along an approximately helical path from the upper opening 111 to the lower opening 113. The lower opening 113 is rotationally offset from the upper opening 111 in a rotational direction as indicated by arrow A in FIG. 3. In other embodiments, the lower opening 113 may be rotationally offset in the opposite rotational direction. The first fluid channel 112 is therefore angled relative to the longitudinal axis 101 by more than zero degrees. In some embodiments, the first fluid channel 112 is at an angle of between about 18° and about 30° relative to the longitudinal axis 101. However, the angle may be adjusted based on the axial length of the body 102 and embodiments are not limited to a specific angle.

In other embodiments, the upper opening 111 and the lower opening 113 may be axially aligned such that the first fluid channel 112 extends from the upper opening 111 to the lower opening 113 in an approximately vertical path and the first fluid channel 112 is approximately parallel with the longitudinal axis 101.

In this embodiment, the first fluid channel 112 has a horizontal cross-section that is approximately oblong or obround in shape. The horizontal cross-section may curve around the circumference of the elongate element 107 resulting in a slight "kidney bean" shape as shown in FIGS. 3 and 4. In other embodiments, the horizontal cross-section of the first fluid channel 112 may be approximately circular, elliptical, or any other suitable shape. In some embodiments, the size and shape of the horizontal cross-section is approximately constant along the axial length of the first fluid channel 112. In these embodiments, the upper opening 111 and the lower opening 113 are approximately the same size and shape. In other embodiments, the size and/or shape of the horizontal cross-section of the first fluid channel 112 may vary at any point along the axial length of the first fluid channel 112. For example, the horizontal cross-section of the first fluid channel 112 may gradually taper from the upper opening 111 to the lower opening 113, or vice versa. In these embodiments, the upper opening 111 may differ in size and/or shape from the lower opening 113.

In some embodiments, the second and third fluid channels 114 and 116 have approximately the same structure as the first fluid channel 112 as described above. In other embodiments, one or both of the second and third fluid channels 114 and 116 differ in structure from the first fluid channel 112 (or from each other).

Although the apparatus 100 is shown with three fluid channels, embodiments may be provided having additional fluid channels. For example, embodiments may be provided having four, five, or six fluid channels spaced circumferentially around the elongate element 107. Alternatively, embodiments may be provided with only two fluid channels, one on either side of the elongate element 107. In some embodiments, the size of the fluid channels may be adjusted such that the total cross-sectional area of all of the fluid channels remains approximately the same regardless of the number of fluid channels.

Figure 7:
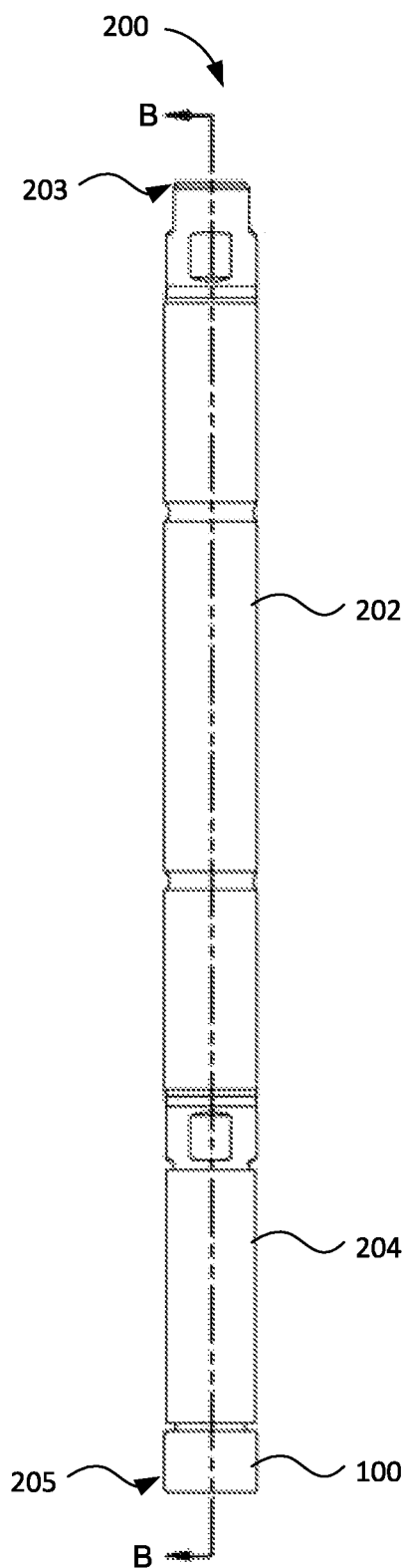
FIG. 7 is a side view of a plunger assembly including the apparatus of FIGS. 2 to 6, according to some embodiments.
Figure 8:
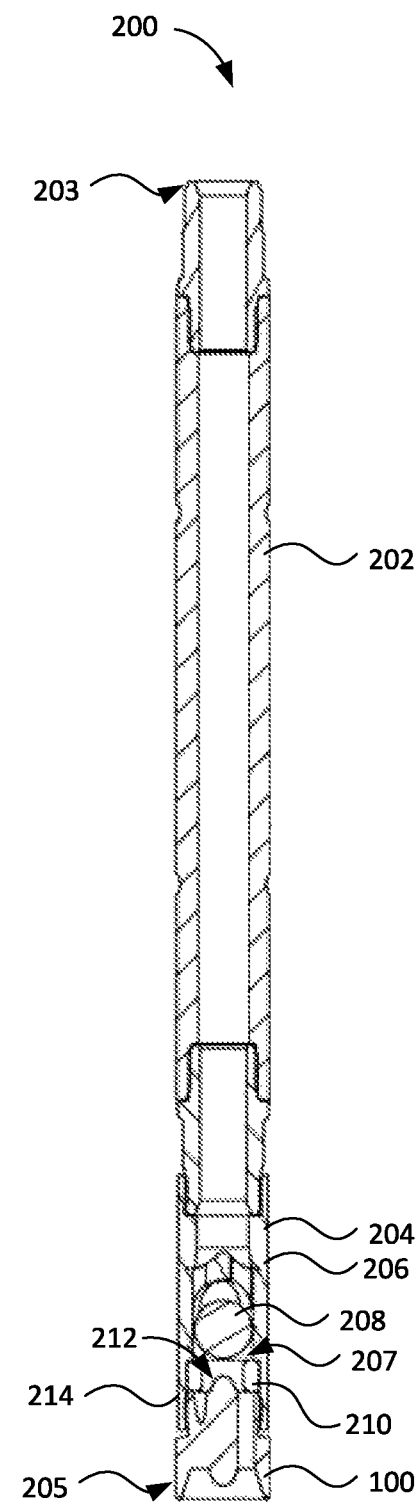
FIG. 8 is a cross-sectional view of the plunger assembly taken along the line B-B in FIG. 7.

FIGS. 7 and 8 are side and cross-sectional views, respectively, of a plunger assembly 200 including the apparatus 100 of FIGS. 2 to 6, according to some embodiments. The plunger assembly 200 may be coupled to a reciprocating rod (not shown) for use in a top cup hold-down pump, a bottom cup hold-down pump, or any other suitable type of reciprocating downhole pump.

The assembly 200 has an uphole end 203 and a downhole end 205. From the uphole end 203 to the downhole end 205, the assembly 200 comprises a plunger 202, a traveling valve 204, and the apparatus 100.

The traveling valve 204 in this embodiment is a ball check valve comprising a traveling flow cage 206 defining a fluid passage 207 therethrough, a valve ball 208, and a ball seat 210. The valve ball 208 sits above the ball seat 210 in the travelling flow cage 206. The ball seat 210 is ring-shaped in this embodiment with a central opening 212 therethrough. When downward pressure causes the valve ball 208 to be seated on the ball seat (e.g. in the upstroke), the valve ball 208 blocks fluid flow in the downhole direction. When the pressure differential is reversed (e.g. in the downstroke), the valve ball 208 is raised from the ball seat 210, allowing upward flow of fluid through the traveling valve 204.

The apparatus 100 may be positioned below (i.e. downhole) of the traveling valve 204 and the body 102 of the apparatus 100 may be coupled to the traveling flow cage 206. The travelling flow cage 206 may comprise a lower attachment section 214 that extends downward past the ball seat 210. The lower attachment section 214 may be configured to normally attach to a conventional plug seat, such as the plug seat 28 of the plunger and rod assembly 20 of FIG. 1B. In this embodiment, the apparatus 100 attaches to the lower attachment section 214 and takes the place of (i.e. replaces) the conventional plug seat. By connecting the apparatus 100 directly to the flow cage 206, there is no "dead volume" where gas can accumulate and compress, thereby reducing the potential for the pump to gas lock.

The body 102 of the apparatus 100 may be partially received into the lower attachment section 214 of the traveling flow cage 206. In this embodiment, the upper portion 118 of the body 102 is received into the lower attachment section 214 of the traveling flow cage 206. The upper attachment section 120 of the body 102 may be configured to engage the lower attachment section 214 to secure the body 102 to the traveling flow cage 206. In some embodiments, the upper attachment section 120 is a threaded section comprising outer threads (not shown) that engage complementary inner threads (not shown) of the lower attachment section 214.

In other embodiments, the upper attachment section 120 is configured to engage the lower attachment section 214 by any other suitable means including, for example, an interference fit. In yet other embodiments, the apparatus 100 may be positioned below the flow cage 206 and may be connected to the flow cage 206 by a bushing or other connector or adaptor element therebetween.

When the apparatus 100 is engaged with the traveling flow cage 206, the body 102 may abut the ball seat 210 such that the apparatus 100 holds the ball seat 210 in the traveling flow cage 206. Specifically, in this embodiment, the annular upper surface 134 of the upper face 123 of the body 102 abuts the ball seat 210. The annular upper surface 134 is approximately axially aligned with the ball seat 210 such that the first, second, and third fluid channels 112, 114, and 116 are aligned with the central opening 212.

Thus, in this embodiment, fluid flowing uphole flows through the apparatus 100 before it reaches the traveling valve 204. Fluid may enter the apparatus 100 via the lower chamber 124. The frusto-conical shape of the chamber 124 may create a relatively gentle transition from the large cross-sectional area of the pump bore (i.e. inner diameter of the barrel; not shown) to the smaller cross-sectional area of the opening 212 of the ball seat 210. This transition may reduce turbulence, reduce the pressure drop, and/or reduce energy loss of the fluid flowing through the apparatus 100. The frusto-conical shape of the chamber 124 and the lower leading edge 131 at the downhole end of the body 102 may also help to direct solids away from the inner wall of the barrel towards a more central fluid path where the solids can be moved through the traveling valve 204 and through the plunger 202. Directing the solids away from the barrel's inner wall may reduce abrasion and wear to the inner wall as well as to the outer diameter of the plunger 202.

Figure 9:
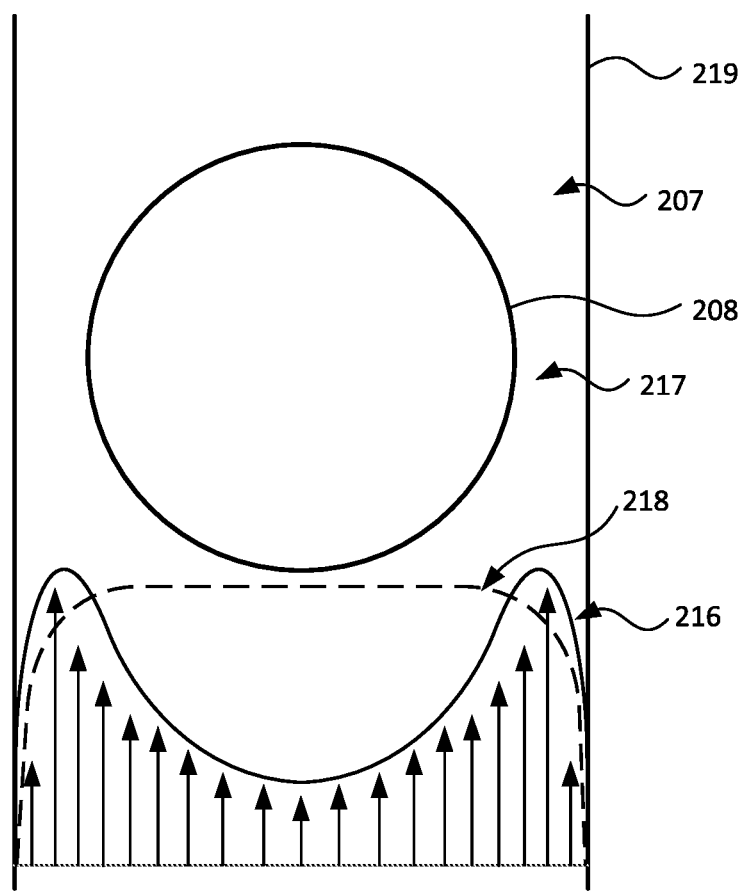
FIG. 9 is a schematic of a velocity profile of fluid flowing through the plunger assembly of FIGS. 7 and 8.

As the fluid flows into the lower chamber 124, it may flow around the lower domed end 110 and into the fluid channels 112, 114, and 116. The lower domed end 110 therefore begins the transition of the flow profile from a "flat" velocity profile to an annular velocity profile (as shown in FIG. 9 and discussed below). The upper domed end 109 may act as a "tail", helping the flow to stay attached smoothly and as long as possible to reduce turbulence and pressure drop as fluid leaves the fluid channels 112, 114, and 116 and enters the central opening 212 of the ball seat 210. The more semi-elliptical shape of the upper domed end 109 may facilitate the "tail" function. The fluid will then continue to flow through the central opening 212 and into the flow passage 207 of the traveling flow cage 206 when the valve ball 208 is unseated.

FIG. 9 shows a velocity profile of fluid flowing through the fluid passage 207 as the fluid approaches the valve ball 208, in the presence of the apparatus 100 (solid line 216) or in the absence of the apparatus 100 (dashed line 218). Note that the apparatus 100 itself is not shown in FIG. 9.

Fluid flowing through the fluid passage 207 around the valve ball 208 passes through an annular space 217 between the maximum diameter of the valve ball 208 and an inner wall 219 of the traveling flow cage 206. In the absence of the apparatus 100, the fluid approaching the valve ball 208 and the annular space 217 will show a velocity profile as indicated by dashed line 218 in FIG. 9 that is relatively flat velocity across the centre of the fluid passage 207 and drops to zero velocity at the inner wall 219 of the flow cage 206.

In contrast, in the presence of the apparatus 100, the fluid approaching the valve ball 208 may show an altered velocity profile as indicated by solid line 216 in FIG. 9. The flow of fluid through the first, second, and third fluid channels 112, 114, and 116 of the apparatus 100 may orient the majority of the velocity profile in an annular profile around the circumference of the valve ball 208 such that the maximum velocity is approximately aligned with the annular space 217.

By improving the velocity profile of the fluid flowing through the annular space 217, the apparatus 100 may reduce or prevent vibration of the valve ball 208 and decrease frictional/vibrational energy loss. Since the annular space 217 represents the smallest cross-sectional area of the downhole pump, it is where most of the pressure drop in the pump occurs. Although the apparatus 100 may increase this pressure drop, the kinetic energy of the fluid flowing through the annular space 217 will increase, resulting in increased pump efficiency.

Further, the apparatus 100 may help to accelerate the flow of fluid out of the downhole pump into the fluid column, allowing for a more fluid downward motion of the pump stroke. A pump chamber (not shown) between the traveling valve 204 and a standing valve in the barrel therebelow may empty faster, thereby reducing the time before the pump chamber is filled on the upstroke.

Another example flow regulation apparatus 300 will be described with reference to FIGS. 10 to 14. The apparatus 300 is configured for use with a standing valve of a barrel assembly of a top cup hold-down downhole pump, as discussed in more detail below.

Figure 10:
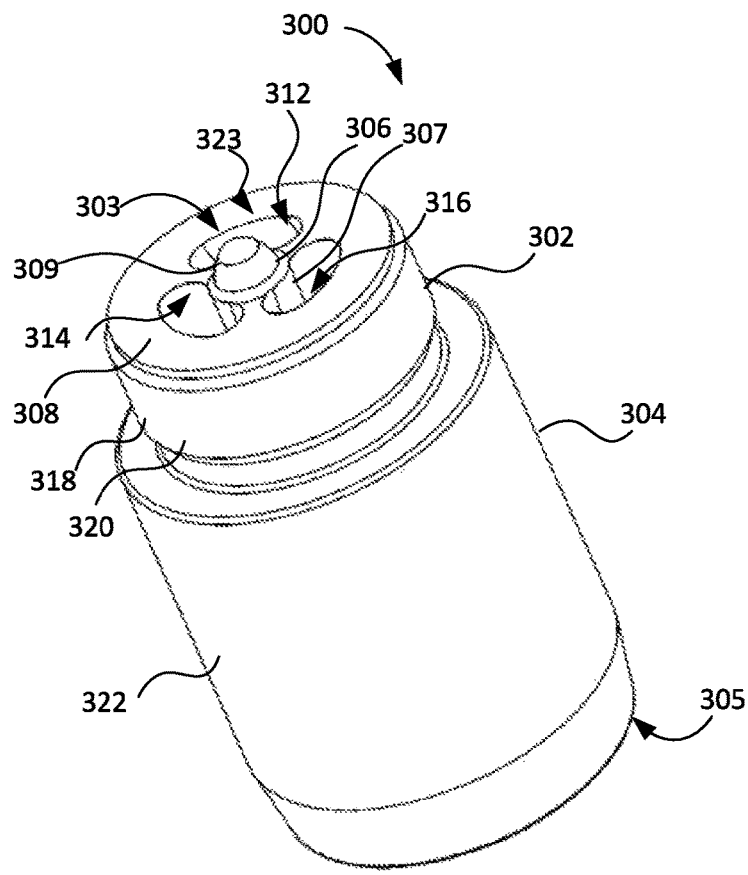
FIG. 10 is a perspective view of another example apparatus, according to some embodiments.

As shown in FIG. 10, the apparatus 300 in this embodiment comprises a body 302 having an outer wall 304, an inner core 306, and a connective portion 308 therebetween. The body 302 may comprise at least two fluid channels extending therethrough.

The body 302 has an uphole end 303 and a downhole end 305. The outer wall 304 of the body 302 comprises an upper portion 318 and a lower portion 322. The upper portion 318 may comprise an upper attachment section 320 configured to engage the standing valve of the barrel assembly, as discussed in more detail below. The lower portion 322 may be configured to be received into a wellbore (not shown) and engage another downhole component. The lower portion 322 may have an outer diameter approximately the same as the outer diameter of the standing valve of the barrel assembly. The outer wall 304 proximate the downhole end 305 of the lower portion 322 may be angled with respect to the longitudinal axis 301.

Figure 14:
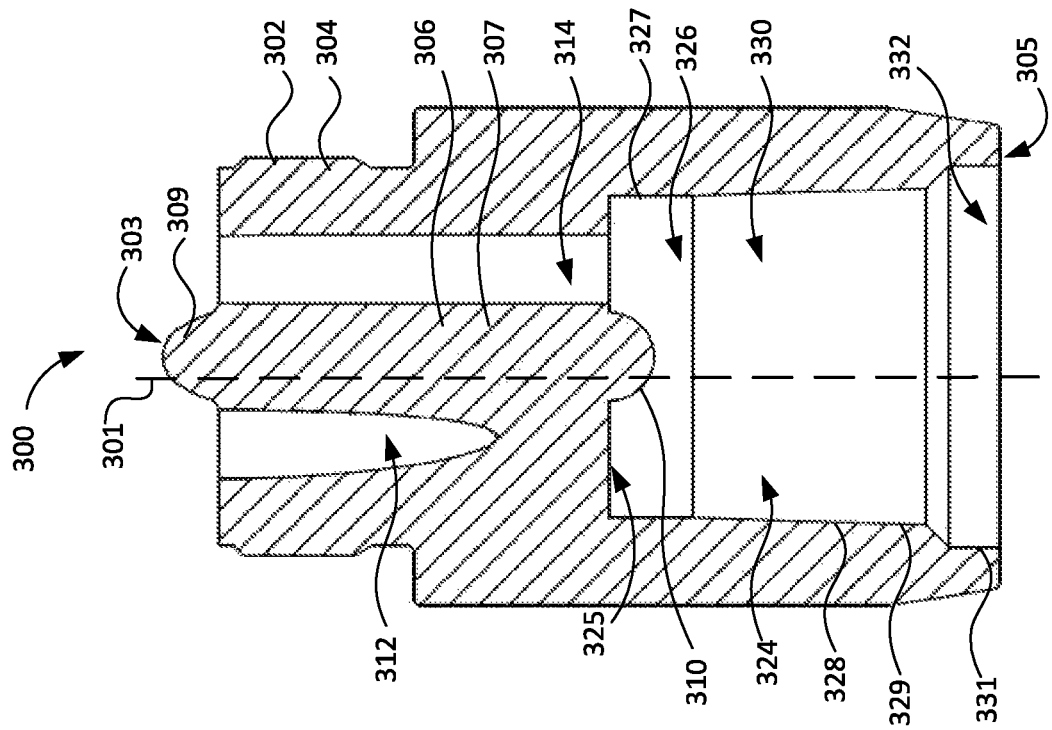
FIG. 14 is a cross-sectional view of the apparatus taken along the line C-C in FIG. 13.
Figure 13:
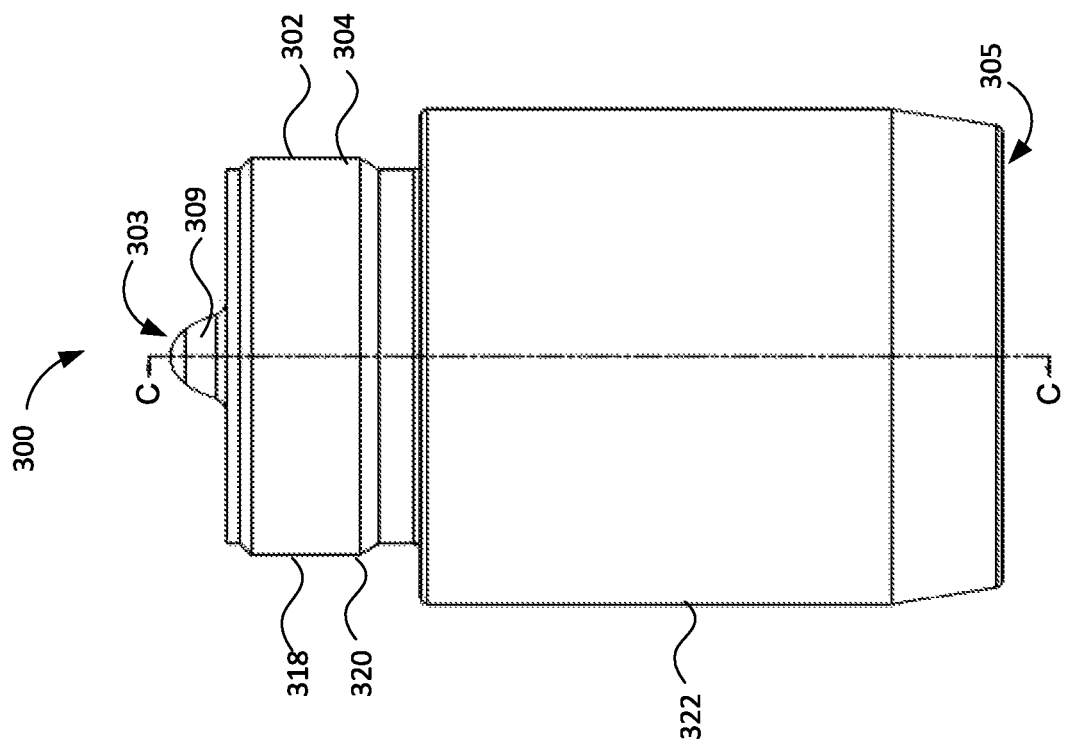
FIG. 13 is a side view of the apparatus of FIG. 10.

The inner core 306 may be positioned approximately at a longitudinal axis 301 of the body 302 (the longitudinal axis 301 is visible in FIG. 14). The inner core 306 may comprise an elongate element 307 having an upper domed end 309 and a lower domed end 310 (the lower domed end 310 is visible in FIGS. 12 and 14). The elongate element 307 may be similar in structure to the elongate element 107 of the apparatus 100 described above.

The connective portion 308 may interconnect the elongate element 307 with the outer wall 304. The connective portion 308 has an upper face 323 (visible in FIGS. 10 and 11) and a lower face 325 (visible in FIGS. 12 and 14). The upper domed end 309 of the elongate element 307 extends upward from the upper face 323 and the lower domed end 310 extends downward from the lower face 325. In this embodiment, the upper face 323 of the connective portion 108 extends slightly above the upper portion 318 of the outer wall 304. The upper domed end 309 of the elongate element 307 extends upward from the upper face 323 of the connective portion 308 such that the upper domed end 309 is the uphole end 303 of the body 302. The lower face 325 of the connective portion 308 is recessed within the lower portion 322 and the lower domed end 310 extends downward from the lower face 325.

Figure 11:
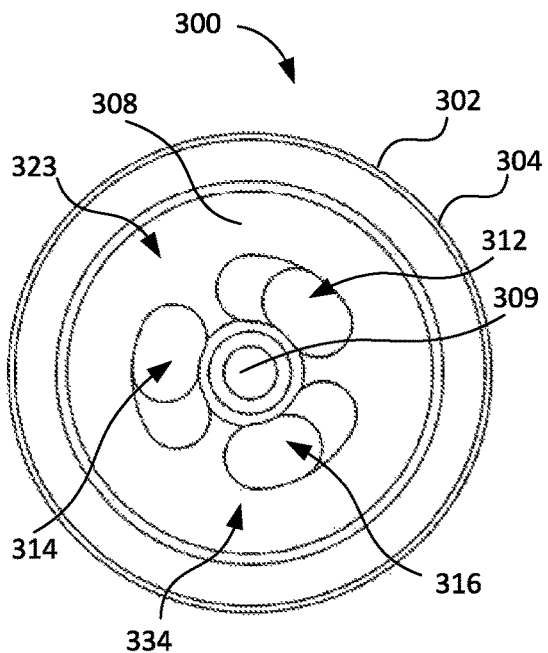
FIG. 11 is a top view of the apparatus of FIG. 10.
Figure 12:
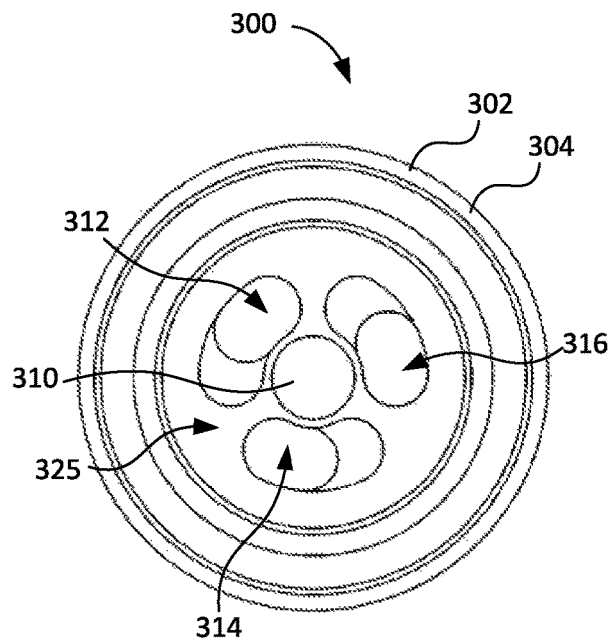
FIG. 12 is a bottom view of the apparatus of FIG. 10.

As shown in FIGS. 11 and 12, in this embodiment, the body 302 comprises a first, second, and third fluid channel 312, 314, and 316 spaced circumferentially around the elongate element 307. The first, second, and third fluid channels 312, 314, and 316 may extend from the upper face 323 of the connective portion 308 to the lower face 325. As shown in FIG. 11, the upper face 323 may comprise an annular upper surface 334 extending around the circumference of the upper face 323 between the fluid channels 312, 314, and 316 and the outer wall 104. The first, second, and third fluid channels 312, 314, and 316 may be similar in structure to the first, second, and third fluid channels 112, 114, and 116 of the apparatus 100 as described above.

As shown in FIG. 14, the body 302 may further comprise a lower chamber 324 at the downhole end 305. The lower chamber 324 is defined by an inner face 328 of the body 302 and extends from the lower face 325 of the connective portion 308 to the downhole end 305 of the body 302.

In this embodiment, the inner face 328 comprises an upper section 327, a middle section 329, and a lower section 331, defining an upper chamber portion 326, a middle chamber portion 330, and a lower chamber portion 332, respectively. The upper chamber portion 326 receives the lower domed end 310 of the elongate element 307 therein. The middle chamber portion 330 and the lower chamber portion 332 may together function as a lower attachment section of the body 302 that is attachable to another downhole component such as a strainer (not shown). In some embodiments, the middle section 329 of the inner face 328 is angled with respect to the longitudinal axis 301 such that the middle chamber portion 330 is slightly frusto-conical in shape. The middle chamber portion 330 may be dimensioned to partially receive an upper portion of the strainer or other downhole component therein. The lower chamber portion 332 may have a greater diameter than the middle chamber portion 330 and may function as a counterbore.

Figure 15:
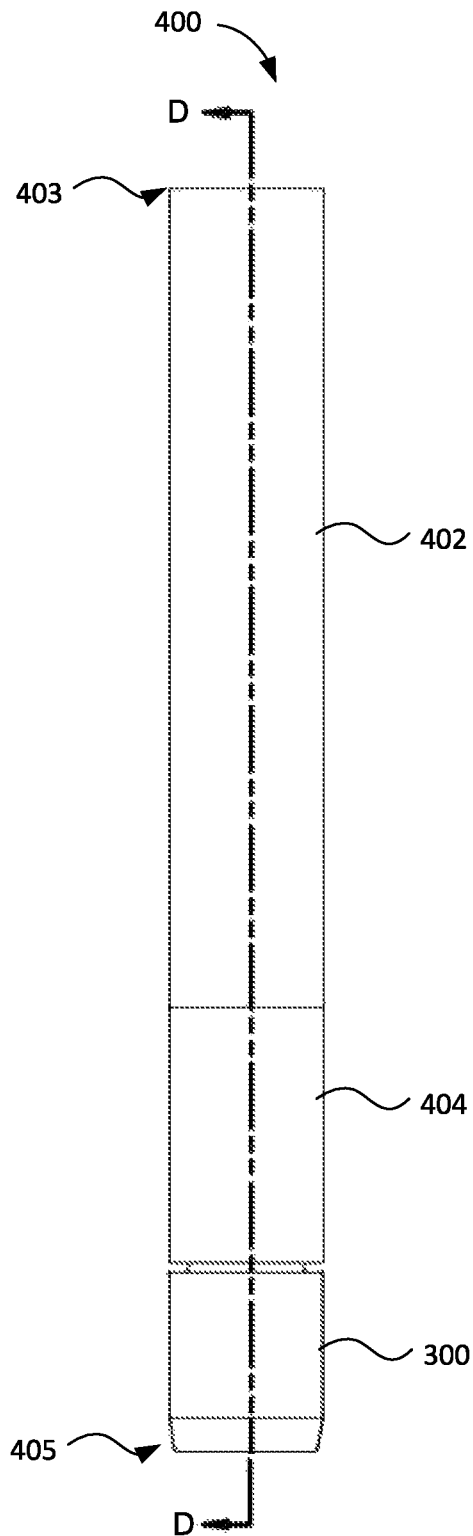
FIG. 15 is a side view of a partial barrel assembly including the apparatus of FIGS. 10 to 14, according to some embodiments.
Figure 16:
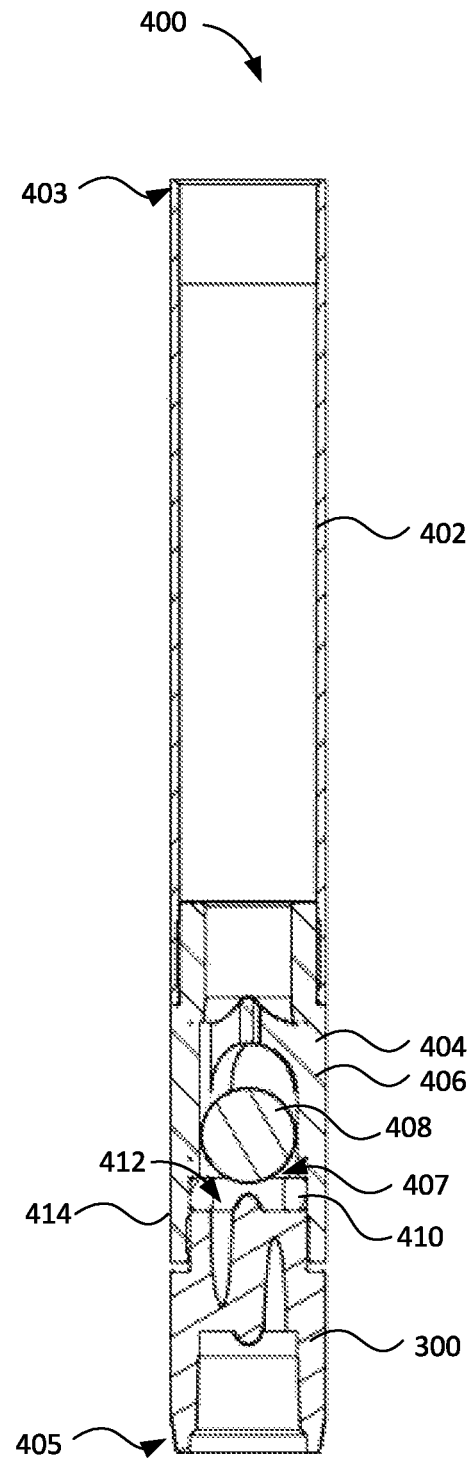
FIG. 16 is a cross-sectional view of the partial barrel assembly taken along line D-D in FIG. 15.

FIGS. 15 and 16 are side and cross-sectional views, respectively, of a partial barrel assembly 400 of a top cup hold-down pump including the apparatus 300 of FIGS. 10 to 14, according to some embodiments. The assembly 400 has an uphole end 403 and a downhole end 405. From the uphole end 403 to the downhole end 405, the assembly 400 comprises a barrel section 402, a standing valve 404, and the apparatus 300 of FIGS. 10 to 14.

As shown in FIG. 16, the standing valve 404 in this embodiment is a ball check valve comprising a standing flow cage 406 defining a fluid passage 407 therethrough, a valve ball 408, and a ball seat 410. The valve ball 408 sits above the ball seat 410 in the standing flow cage 406. The ball seat 410 is ring-shaped with a central opening 412 therethrough. When seated, the valve ball 408 blocks the central opening 412 of the ball seat 410, thereby preventing fluid flow through the standing flow cage 406. When downward pressure causes the valve ball 408 to be seated on the ball seat 410 (e.g. in the downstroke), the valve ball 408 blocks fluid flow in the downhole direction. When the pressure differential is reversed (e.g. in the upstroke), the valve ball 408 is raised from the ball seat 410, allowing upward flow of fluid through the standing valve 404.

The standing flow cage 406 may comprise a lower attachment section 414 that extends downward past the ball seat 410. The lower attachment section 414 may be configured to normally engage a conventional bushing, such as the bushing 16 of the barrel assembly 10 of FIG. 1A. In this embodiment, the apparatus 300 engages the lower attachment section 414 of the flow cage 406 and takes the place of (i.e. replaces) the conventional bushing.

The body 302 of the apparatus 300 may be partially received into the lower attachment section 414 of the standing flow cage 406. In this embodiment, the upper portion 318 of the body 302 is received into the lower attachment section 414. The upper attachment section 320 may engage the lower attachment section 414 to secure the body 302 to the standing flow cage 406. In some embodiments, the upper attachment section 320 is a threaded section comprising outer threads (not shown) that engage complementary inner threads (not shown) of the lower attachment section 414. In other embodiments, the upper attachment section 320 is configured to engage the lower attachment section 414 by any other suitable means.

The middle chamber portion 330 of the body 302 may at least partially receive an upper portion of a downhole component such as a strainer (not shown) therein. In some embodiments, the middle section 329 of the inner face 328 may comprise inner threads (not shown) that engage outer threads on a complementary attachment section of the strainer or other downhole component. In some embodiments, the middle section 329 of the inner face 328 comprises a tapered line pipe thread that threadingly engages mating threads in the strainer. The lower chamber portion 332 may function as a counterbore. In other embodiments, the body 302 is configured to engage any suitable downhole component by any other suitable means.

When the apparatus 300 is engaged with the traveling flow cage 406, the annular upper surface 334 of the body 302 abuts the ball seat 410. The annular surface 334 may be axially aligned with the ball seat 410 such that the first, second, and third fluid channels 312, 314, and 316 are aligned with the central opening 412 of the ball seat 410. Therefore, when the valve ball 408 of the standing valve 404 is unseated, fluid flowing upwards through the first, second, and third fluid channels 312, 314, and 316 will flow through the central opening 412 and into the fluid passage 407 of the standing flow cage 406.

The apparatus 300 may thereby align a velocity profile of the fluid flowing into the fluid passage 407 with an annular space (not shown) between the valve ball 408 and the inner wall of the standing flow cage 406, in a similar manner to the apparatus 100 as described above. The apparatus 300 may thereby accelerate the flow of fluid into a pump chamber (not shown) between the standing valve 404 and a traveling valve of a plunger assembly.

Figure 17:
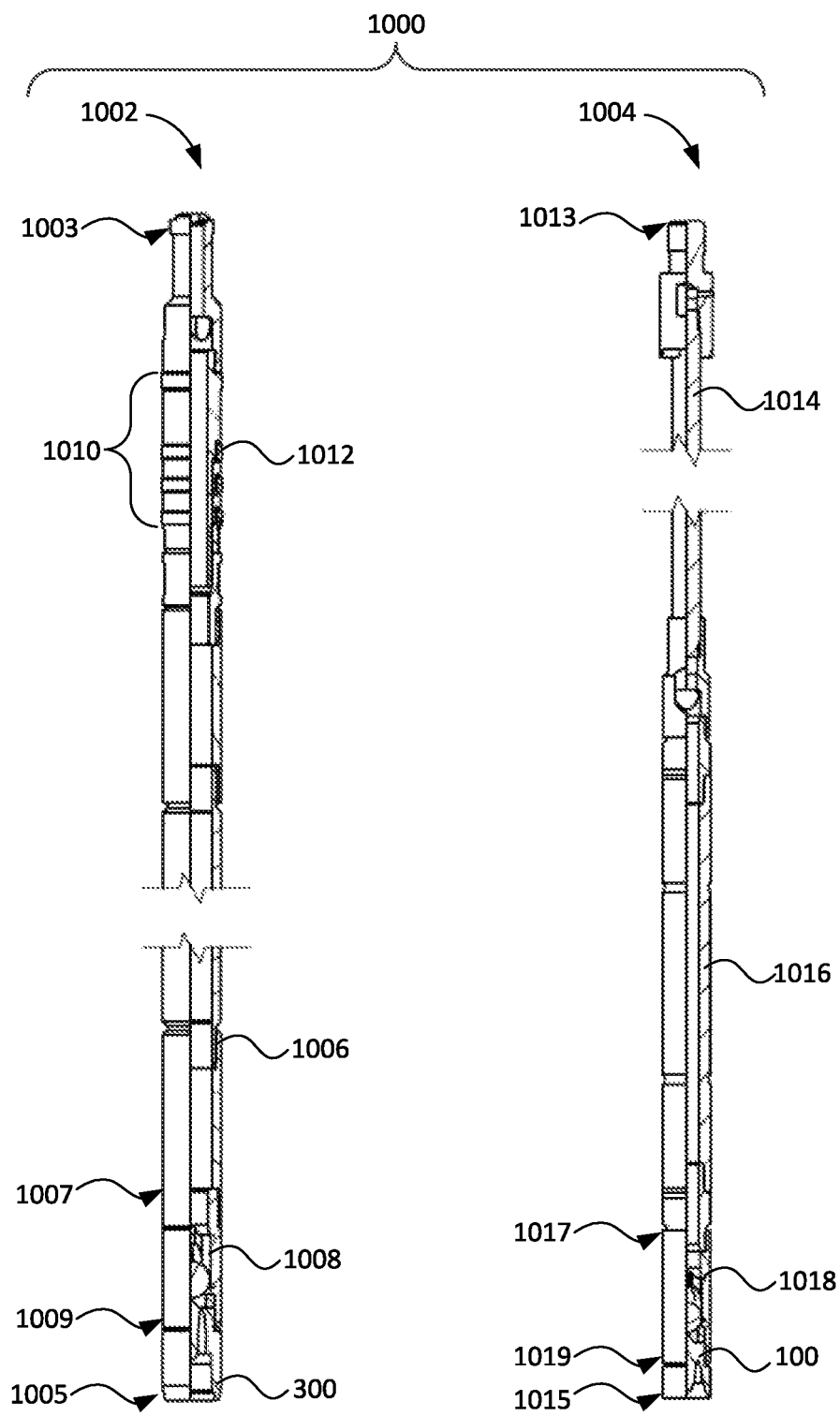
FIG. 17 is a disassembled, partial cross-sectional view of a downhole pump system including the apparatus of FIGS. 2 to 6 and the apparatus of FIGS. 10 to 14, according to some embodiments.

FIG. 17 is a disassembled, partial cross-sectional view of an example downhole pump system 1000 including the apparatus 100 of FIGS. 2 to 6 and the apparatus 300 of FIGS. 10 to 14. The pump system 1000 in this embodiment is a top cup hold-down type pump.

The pump system 1000 comprises a barrel assembly 1002 and a plunger and valve rod assembly 1004. The barrel assembly 1002 is positioned in a wellbore (not shown) and has an uphole end 1003 and a downhole end 1005. The barrel assembly 1002 comprises a barrel 1006, a standing valve 1008, a hold-down assembly 1010, and the apparatus 300. The hold-down assembly 1010 is positioned proximate the uphole end 1003 and includes seating cups 1012 to create a seal between the barrel assembly 1002 and the tubing of the wellbore. The barrel 1006 extends downward from the hold-down assembly 1010 to the standing valve 1008. The standing valve 1008 has an uphole end 1007 and a downhole end 1009. The uphole end 1007 of the standing valve 1008 is coupled to the barrel 1006 and the downhole end 1009 is coupled to the apparatus 300, making the apparatus 300 the downhole end 1005 of the overall barrel assembly 1002.

The plunger and valve rod assembly 1004 comprises a valve rod 1014, a plunger 1016, a traveling valve 1018, and the apparatus 100. The assembly 1004 has an uphole end 1013 and a downhole end 1015. The valve rod 1014 is positioned at the uphole end 1013 and extends downward to couple to the plunger 1016. The traveling valve 1018 has an uphole end 1017 and a downhole end 1019. The traveling valve 1018 is positioned below the plunger 1016 and is coupled to the plunger 1016 traveling at its uphole end 1017. The downhole end 1019 of the traveling valve 1018 is coupled to the apparatus 100, making the apparatus 100 the downhole end 1015 of the plunger and rod assembly 1004.

In use, the plunger and rod assembly 1004 may be received into the barrel assembly 1002 such that the traveling valve 1018 and the apparatus 100 are positioned in the barrel 1006 above the standing valve 1008. Fluid entering the barrel assembly 1002 flows through the apparatus 300 and through the standing valve 1008 before entering the apparatus 100 and flowing through the apparatus 100 and the traveling valve 1018. The apparatuses 300 and 100 can therefore facilitate the flow of fluid through the entire pump system 1000.

Other variations are also possible. In other embodiments, the system 1000 may comprise the apparatus 100, but not the apparatus 300, or vice versa.

Another example apparatus 500 will be described with reference to FIGS. 18 to 22. The apparatus 500 is configured for use with a standing valve of a barrel assembly of a bottom cup hold-down downhole pump, as discussed in more detail below.

Figure 18:
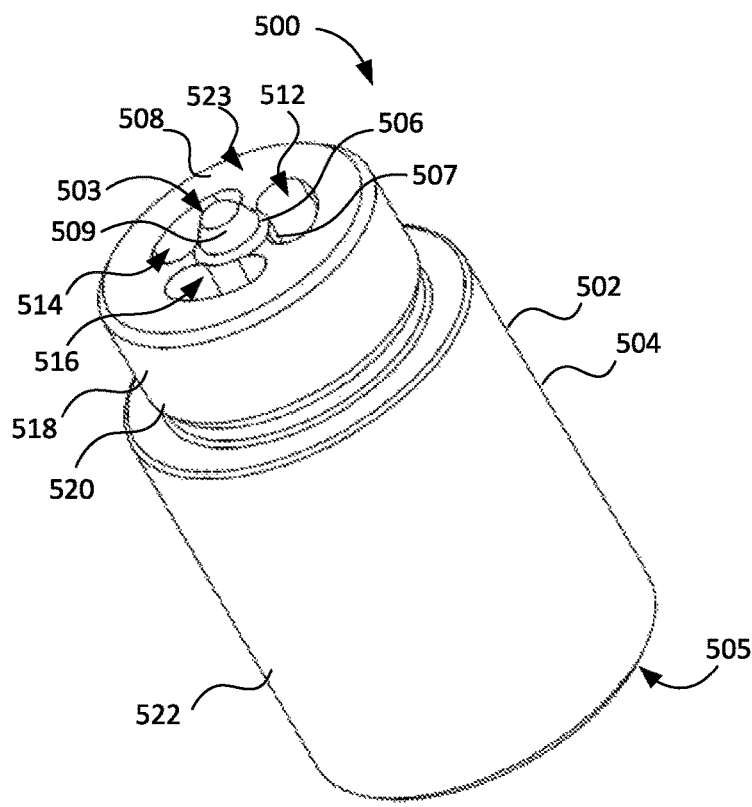
FIG. 18 is a perspective view of another example apparatus, according to some embodiments.

As shown in FIG. 18, the apparatus 500 in this embodiment comprises a body 502 having an outer circumferential wall 504, an inner core 506, and a connective portion 508 therebetween. The body 502 may comprise at least two fluid channels extending therethrough.

The body 502 has an uphole end 503 and a downhole end 505. The outer wall 504 of the body 502 may comprise an upper portion 518 and a lower portion 522. The upper portion 518 may comprise an upper attachment section 520 configured to engage the standing valve of the barrel assembly, as discussed in more detail below. The lower portion 522 may be configured to be received into a wellbore. The lower portion 522 may have an outer diameter approximately the same as the outer diameter of the standing valve of the barrel assembly.

Figure 20:
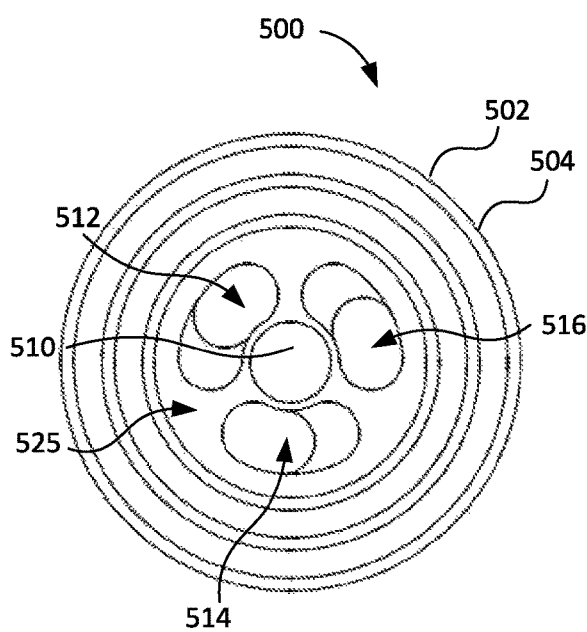
FIG. 20 is a bottom view of the apparatus of FIG. 18.
Figure 22:
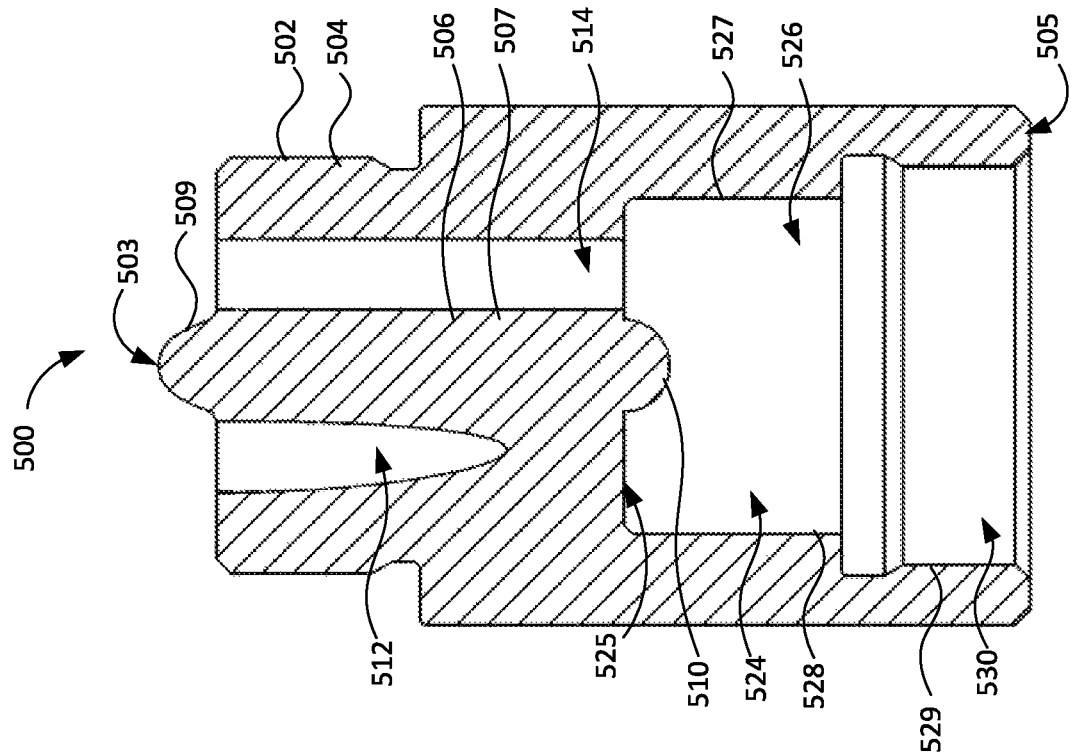
FIG. 22 is a cross-sectional view of the apparatus taken along the line E-E in FIG. 21.
Figure 21:
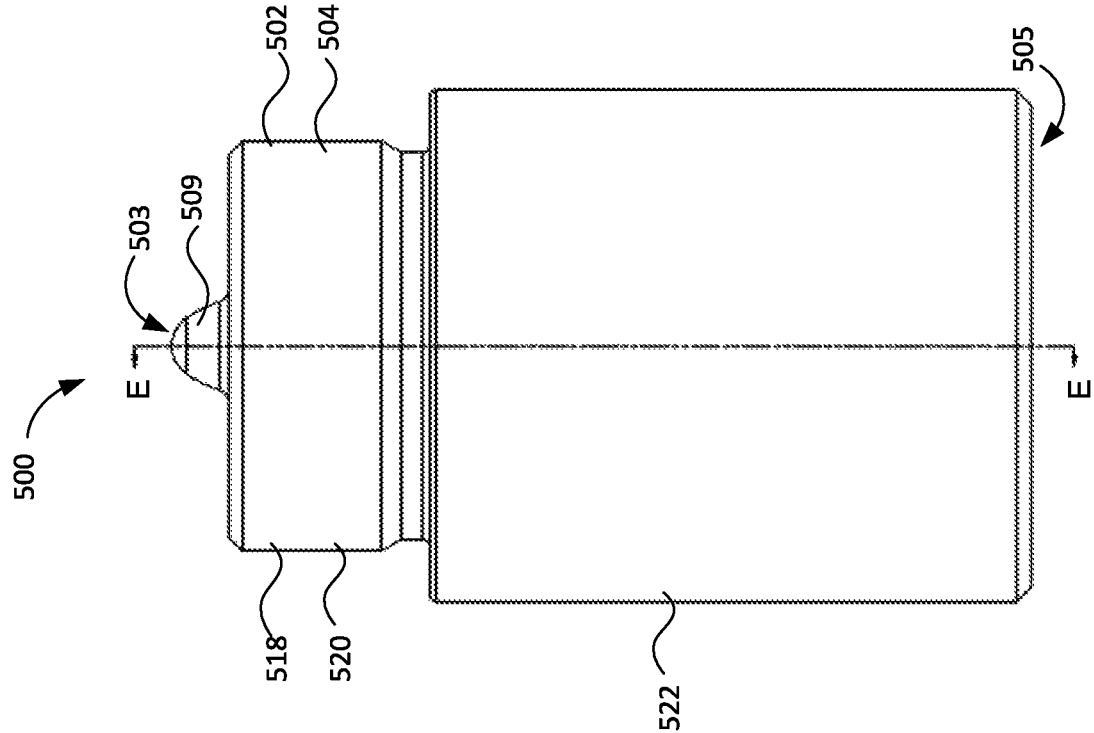
FIG. 21 is a side view of the apparatus of FIG. 18.

The inner core 506 may comprise an elongate element 507 having an upper domed end 509 and a lower domed end 510 (the lower domed end 510 is visible in FIGS. 20 and 22).

The elongate element 507 may be similar in structure to the elongate element 107 of the apparatus 100 described above.

The connective portion 508 may interconnect the elongate element 507 with the outer wall 504. The connective portion 508 may have an upper face 523 (visible in FIGS. 18 and 19) and a lower face 525 (visible in FIGS. 20 and 22). The upper domed end 509 of the elongate element 507 may extend upward from the upper face 523 and the lower domed end 510 may extend downward from the lower face 525.

Figure 19:
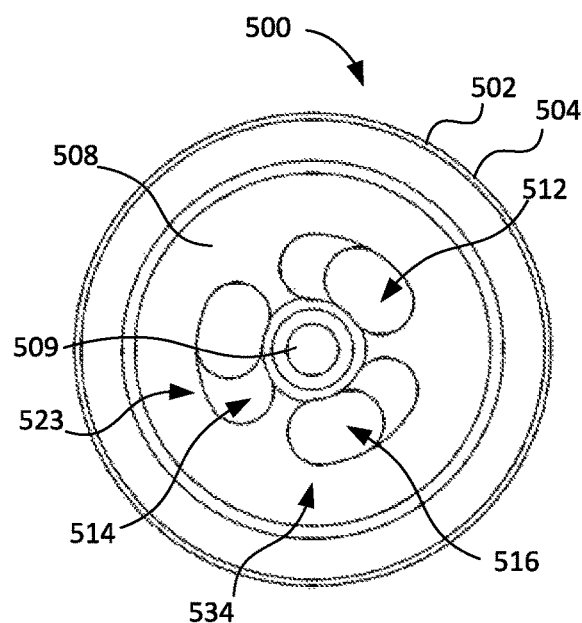
FIG. 19 is a top view of the apparatus of FIG. 18.

As shown in FIGS. 19 and 20, in this embodiment, the body 502 comprises a first, second, and third fluid channel 512, 514, and 516 distributed circumferentially around the elongate element 507. The first, second, and third fluid channels 512, 514, and 516 may extend from the upper face 523 of the connective portion 508 to the lower face 525. As shown in FIG. 19, the upper face 523 may comprise an annular upper surface 534 extending around the circumference of the upper face 523 between the fluid channels 512, 514, 516 and the outer wall 504. The first, second, and third fluid channel 512, 514, and 516 may be similar in structure to the first, second, and third fluid channels 112, 114, and 116 of the apparatus 100 as described above.

Referring to FIG. 22, the body 502 comprises a lower chamber 524 at the downhole end 505. The lower chamber 524 is defined by an inner face 528 of the body 502 and extends from the lower face 525 of the connective portion 508 to the downhole end 505.

In this embodiment, the inner face 528 comprises an upper section 527 and a lower section 529, defining an upper chamber portion 526 and a lower chamber portion 530, respectively. The upper chamber portion 526 receives the lower domed end 510 of the elongate element 507 therein. The lower chamber portion 530 may function as a lower attachment section for the body 502 and is attachable to a mandrel of hold-down assembly, as described in more detail below.

Figure 23:
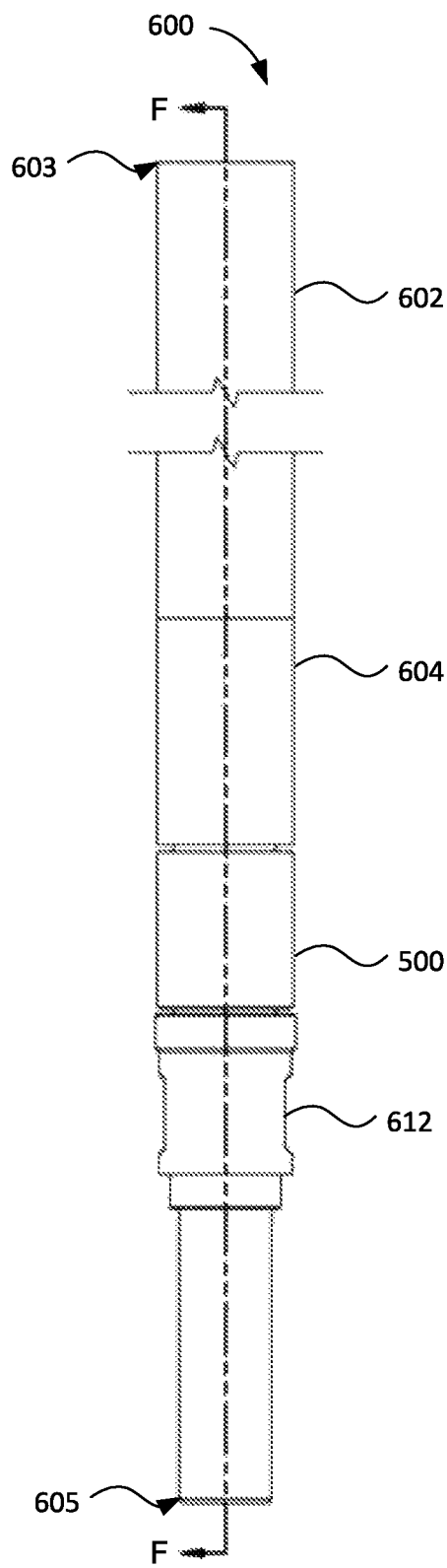
FIG. 23 is a side view of a partial barrel assembly including the apparatus of FIGS. 18 to 22, according to some embodiments.
Figure 24:
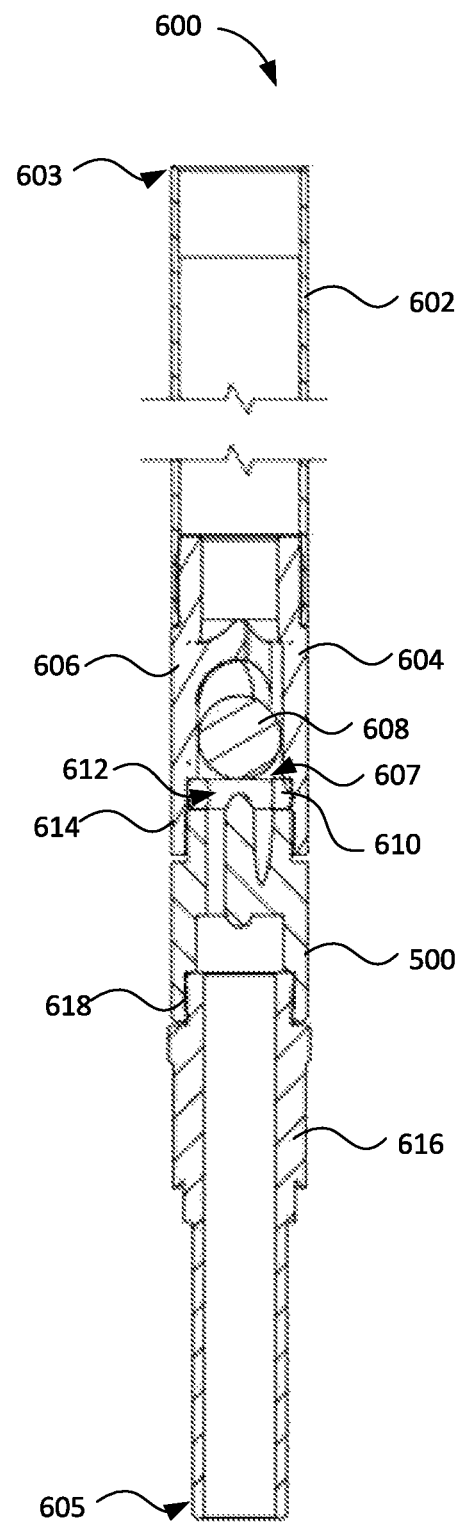
FIG. 24 is a cross-sectional view of the partial barrel assembly taken along the line F-F in FIG. 23.

FIGS. 23 and 24 are side and cross-sectional views, respectively, of a partial barrel assembly 600 of a bottom cup hold-down pump including the apparatus 500 of FIGS. 18 to 22, according to some embodiments.

The assembly has an uphole end 603 and a downhole end 605. From the uphole end 603 to the downhole end 605, the assembly 600 comprises a barrel section 602, a standing valve 604, the apparatus 500, and a mandrel 616 of a hold down assembly (the rest of the hold-down assembly is not shown). The hold-down assembly, including the mandrel 616, may be similar in structure to the hold-down assembly 32, including mandrel 36, of the barrel assembly 30 of FIG. 1C.

As shown in FIG. 24, the standing valve 604 in this embodiment is a ball check valve comprising a standing flow cage 606 defining a fluid passage 607 therethrough, a valve ball 608, and a ball seat 610. The standing valve 604 is similar in structure to the standing valve 404 of the barrel assembly 400 described above. The valve ball 608 sits above the ball seat 610 in the flow cage 606. The ball seat 610 is ring-shaped with a central opening 612 therethrough.

The standing flow cage 606 may comprise a lower attachment section 614 that extends downward past the ball seat 610. The lower attachment section 614 may be configured to normally attach to an upper attachment section 618 of the mandrel 616. In this embodiment, the apparatus 500 attaches to the lower attachment section 614 of the flow cage 606 and interconnects the flow cage 606 with the mandrel 616.

The body 502 of the apparatus 500 may be partially received into the lower attachment section 614. In this embodiment, the upper portion 518 of the body 502 is received into the lower attachment section 614 of the standing flow cage 606 such that the upper attachment section 520 engages the lower attachment section 614 of the standing flow cage 606. In some embodiments, the upper attachment section 520 is a threaded portion comprising outer threads (not shown) that engage complementary inner threads (not shown) of the lower attachment section 614. In other embodiments, the upper attachment section 520 is configured to engage the lower attachment section 614 by any other suitable means.

In this embodiment, the lower chamber portion 530 of the body 502 receives the upper attachment section 618 of the mandrel 616 therein. In some embodiments, the lower section 529 of the inner face 528 comprises inner threads (not shown) that engage complementary outer threads (not shown) on the upper attachment section 618. In other embodiments, the body 502 is configured to engage the mandrel 616 by any other suitable means.

The assembly 600 may be incorporated into a pump system similar to the pump system 1000 but with the hold-down assembly positioned proximate the downhole end of the system. The apparatus 500 may function in a similar manner to the apparatus 300 as described above to alter the velocity profile of the fluid approaching the fluid passage 607 of the standing valve 604.

Another example apparatus 700 will be described with reference to FIGS. 25 to 29. The apparatus 700 is an alternative embodiment of the apparatus 300 and is configured for use with a standing valve of a barrel assembly of a top cup hold-down downhole pump, as discussed in more detail below.

Figure 25:
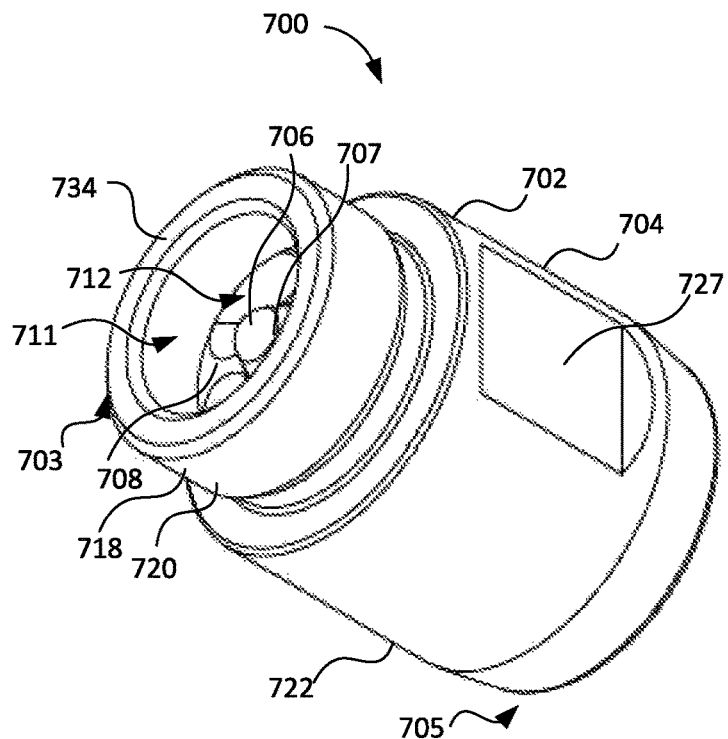
FIG. 25 is a perspective view of another example apparatus, according to some embodiments.

As shown in FIG. 25, the apparatus 700 in this embodiment comprises a body 702 having an outer wall 704, an inner core 706, and a connective portion 708 therebetween. The body 702 may comprise at least two fluid channels extending therethrough.

The body 702 has an uphole end 703 and a downhole end 705. The outer wall 704 of the body 702 comprises an upper portion 718 and a lower portion 722. The upper portion 718 may comprise an upper attachment section 720 configured to engage the standing valve of the barrel assembly, as discussed in more detail below. The lower portion 722 may be configured to be received into a wellbore (not shown). In some embodiments, the lower portion 722 comprises wrench flats 727 on opposed sides of the body 702 to facilitate installation and removal of the apparatus 700 from a barrel assembly.

Figure 29:
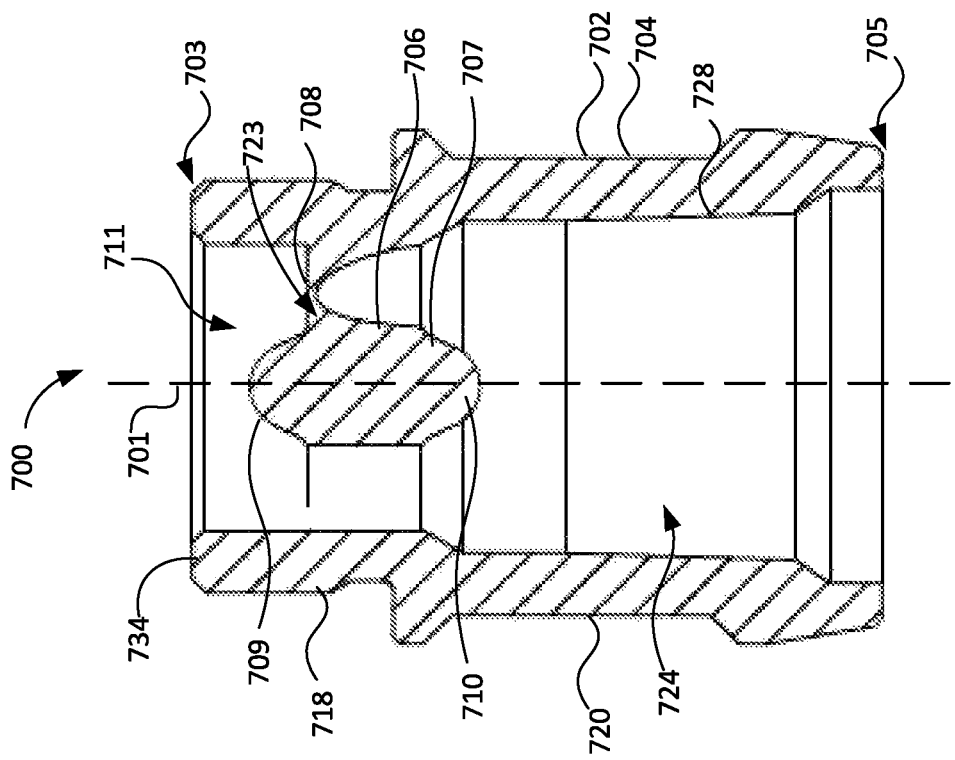
FIG. 29 is a cross-sectional view of the apparatus taken along line G-G in FIG. 28.
Figure 28:
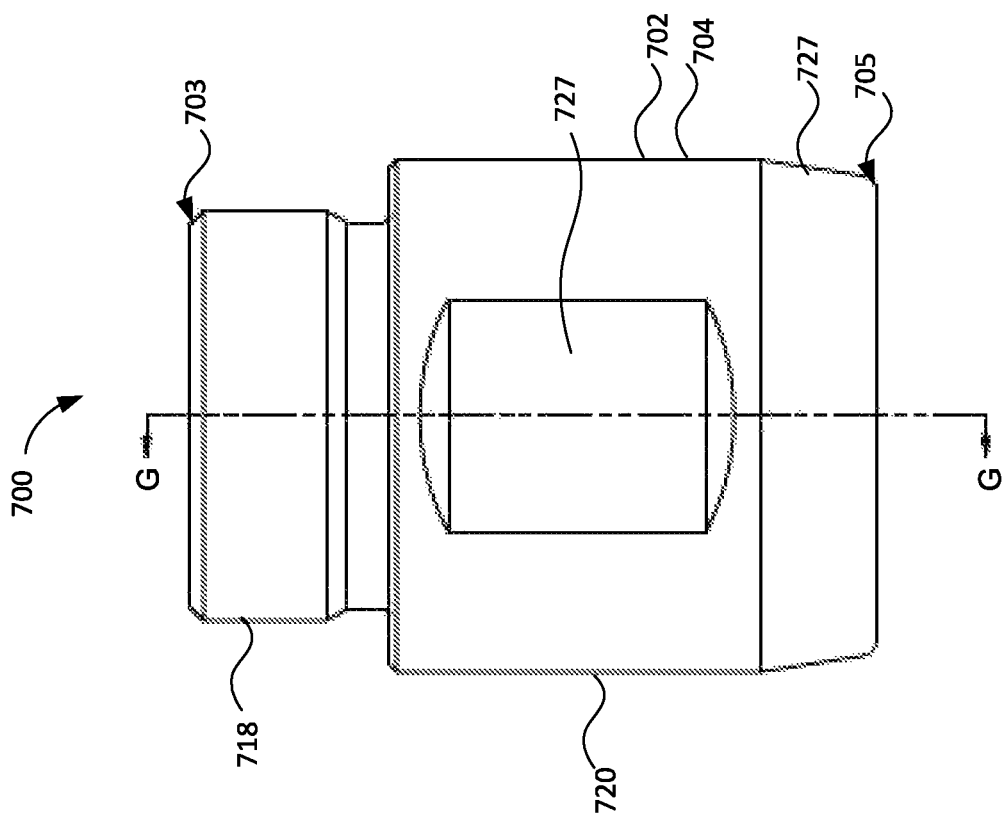
FIG. 28 is a side view of the apparatus of FIG. 25.

The inner core 706 may be positioned approximately along a longitudinal axis 701 of the body 702 (the longitudinal axis 701 is visible in FIG. 29). The inner core 706 may comprise an elongate element 707 having an upper domed end 709 (visible in FIGS. 26 and 29) and a lower domed end 710 (visible in FIGS. 27 and 29). The elongate element 707 may be similar in structure to the elongate element 307 of the apparatus 300 but with a shorter longitudinal height between the upper domed end 709 and the lower domed end 710.

The connective portion 708 may interconnect the elongate element 707 with the outer wall 704. The connective portion 708 may have an upper face 723 (visible in FIGS. 26 and 29) and a lower face 725 (visible in FIG. 27). The upper domed end 709 of the elongate element 707 may extend upward from the upper face 723 and the lower domed end 710 may extend downward from the lower face 725.

As shown in FIG. 29, in this embodiment, the body 702 comprises an upper chamber 711 at the uphole end 703 of the body 702. The upper chamber 711 extends from the upper face 723 of the connective portion 708 to the uphole end 703 of the body 702. The upper domed end 709 of the elongate element 707 is therefore recessed within the chamber 711, below the uphole end 703. The body 702 further comprises an annular upper surface 734 at the uphole end 703 extending around the circumference of the upper chamber 711.

Figure 26:
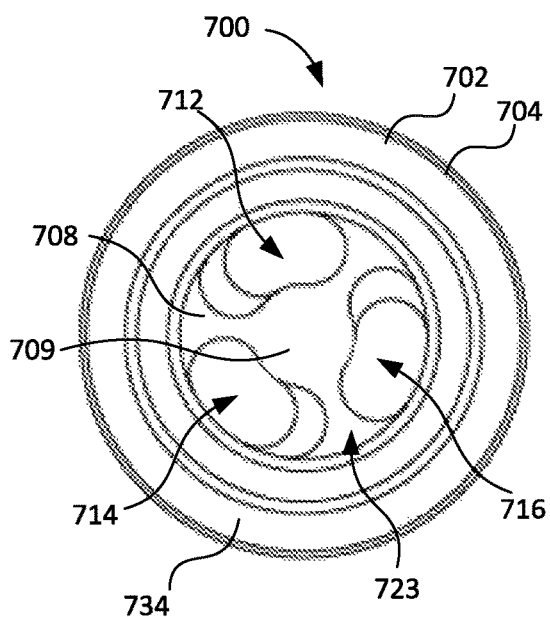
FIG. 26 is a top view of the apparatus of FIG. 25.
Figure 27:
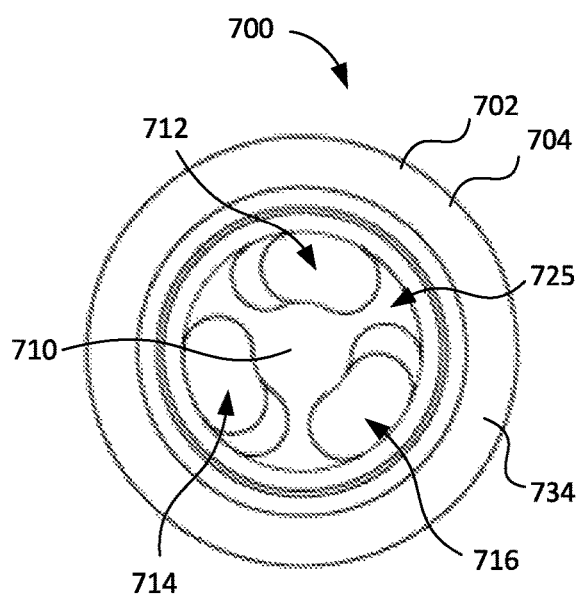
FIG. 27 is a bottom view of apparatus of FIG. 25.

As shown in FIGS. 26 and 27, the body 702 comprises a first, second, and third fluid channel 712, 714, and 716 distributed circumferentially around the elongate element 707. The first, second, and third fluid channels 712, 714, and 716 may extend from the upper face 723 of the connective portion 708 to the lower face 725.

Referring again to FIG. 29, the body 702 may further comprise a lower chamber 724 at the downhole end 705. The lower chamber 724 is defined by an inner face 728 and extends from the lower face 725 of the connective portion 708 to the downhole end 705 of the body 702. The lower chamber 724 and the inner face 728 may be similar in structure to the lower chamber 324 and the inner face 328 of the apparatus 300 as described above.

Figure 30:
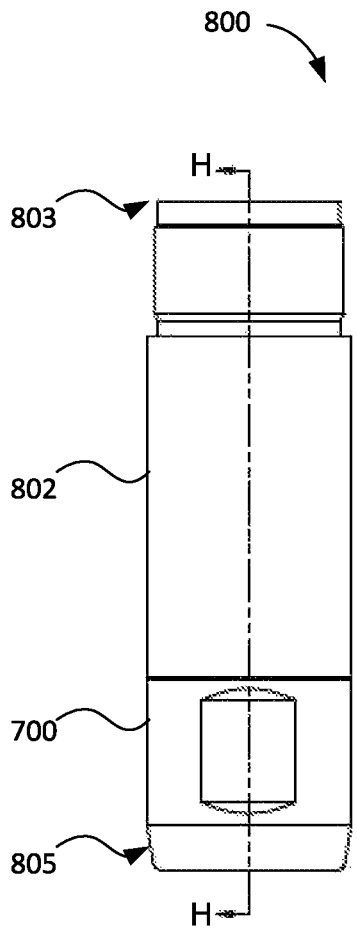
FIG. 30 is a side view of a valve assembly including the apparatus of FIGS. 25 to 29, according to some embodiments.
Figure 31:
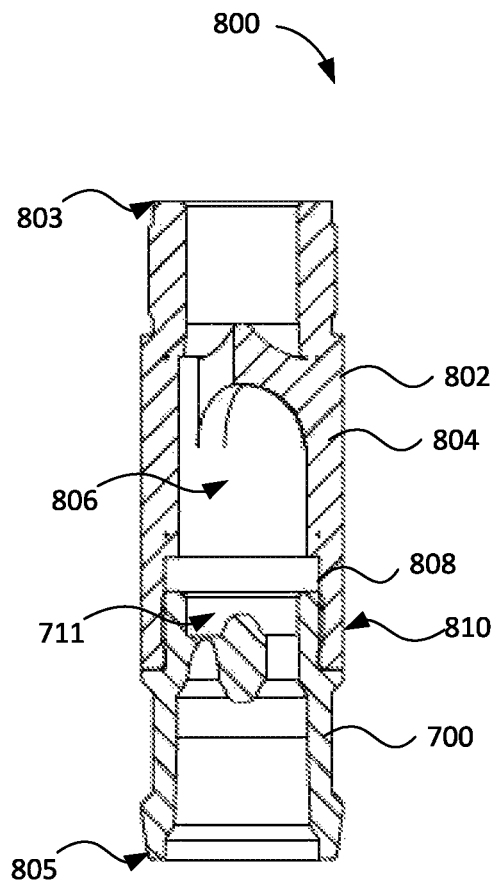
FIG. 31 is a cross-sectional view of the valve assembly taken along line G-G in FIG. 30.

FIGS. 30 and 31 are side and cross-sectional views, respectively, of a valve assembly 800, including the apparatus 700 of FIGS. 25 to 29, according to some embodiments. The valve assembly 800 may be used in a barrel assembly of a top cup hold-down pump. The assembly 800 has an uphole end 803 and a downhole end 805. The assembly 800 comprises a standing valve 802 at the uphole end 803 and the apparatus 700 at the downhole end 805.

Referring to FIG. 31, the standing valve 802 in this embodiment is a ball check valve similar to the standing valve 404 of the assembly 400 as described above. The standing valve 802 comprises a standing flow cage 804 defining a fluid passage 806 therethrough, a valve ball (not shown), and a ball seat 808. The ball seat 808 is ring-shaped with a central opening (not shown) therethrough.

The standing flow cage 804 may comprise a lower attachment section 810 that extends downward past the ball seat 808. The upper portion 718 of the body 702 of the apparatus 700 may be received into the lower attachment section 810 such that the body 702 abuts the ball seat 808. Specifically, in this embodiment, the annular surface 734 of the body 702 abuts the ball seat 808. The apparatus 700 may thereby hold the ball seat 808 in the standing flow cage 804. The apparatus 700 may also engage a downhole component such as a strainer (not shown) via the lower chamber 724 of the body 702.

In alternative embodiments, the ball seat 808 may be omitted and the upper portion 718 of the body 702 may function as the ball seat for the valve ball. In these embodiments, the upper portion 718 may have a greater longitudinal height. However, as conventional ball seats are made of a different material than the apparatus 700 and tend to fail more frequently, the apparatus 700 may require more frequent replacement in these embodiments.

When the apparatus 700 is engaged with the standing flow cage 804, the annular surface 734 of the upper face 723 of the body 702 may be axially aligned with the ball seat 808 such that the first, second, and third fluid channels 712, 714, and 716 and the upper chamber 711 are aligned with the central opening of the ball seat 808. Therefore, when the valve ball of the standing valve 802 is unseated, fluid flowing upwards through the first, second, and third fluid channels 712, 714, and 716 will flow through the upper chamber 711 and into the fluid passage 806 of the standing flow cage 804 via the central opening in the ball seat 808.

The apparatus 700 may thereby align a velocity profile of the fluid flowing into the fluid passage 806 with an annular space (not shown) between the valve ball and the inner wall of the standing flow cage 804, in a similar manner as described above with respect to the apparatus 100. In this embodiment, the upper chamber 711 may provide additional flow area for the fluid exiting the first, second, and third fluid channels 712, 714, and 716 and flowing through the central opening of the ball seat 808. The fluid exiting the channels 712, 714, and 716 may therefore expand and form a vortex flow that continues through the central opening and into the fluid passage 806 of the standing flow cage 804.

Other variations are also possible. The flow regulation apparatuses described herein may be adapted for use with other types of valves and in other types of downhole pump systems. Embodiments are not limited to the specific standing and traveling valves, or barrel and plunger assemblies, described herein.

Figure 32:
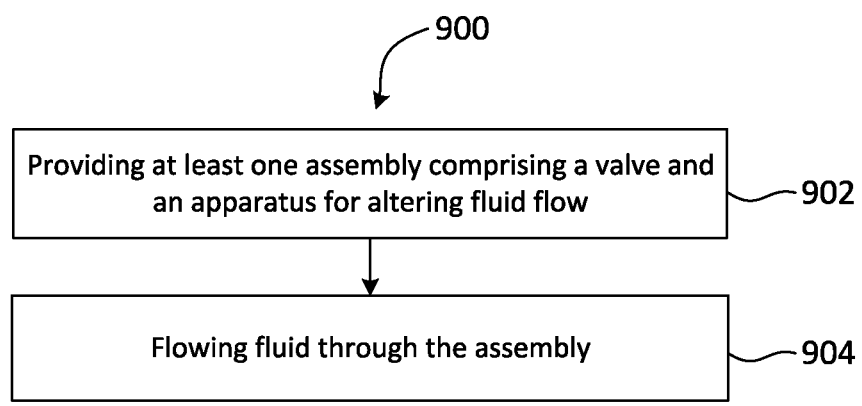
FIG. 32 is a flowchart of an example method, according to some embodiments.

FIG. 32 is a flowchart of a method 900 for altering fluid flow in a downhole pump. The downhole pump may be positioned in wellbore in a subterranean formation and comprise a barrel assembly and a plunger assembly.

At block 902, at least one assembly is provided, each assembly comprising a valve and an apparatus for altering fluid flow. The term "providing" in this context refers to making, assembling, receiving or otherwise obtaining the assembly. The valve may be a traveling valve or a standing valve and may comprise a flow cage and a valve ball within the flow cage. The valve may be in the form of any of the valves 204, 404, 604, and 802 shown in FIGS. 7-8, 15-16, 23-24, and 30-31. The apparatus may comprise a body comprising an outer wall, an inner core, and at least two fluid channels between the outer wall and the inner core. The apparatus may be in the form of any of the apparatuses 100, 300, 500, or 700 as shown in FIGS. 2 to 31.

The apparatus may be positioned below the valve ball of the valve. In some embodiments, the apparatus is coupled to the flow cage of the valve. In some embodiments, the valve further comprises a ball seat within the flow cage below the valve ball. In these embodiments, the apparatus may be partially received into the flow cage such that the body abuts the ball seat.

In embodiments in which the valve is a standing valve, the assembly forms part of the barrel assembly. In embodiments in which the valve is a traveling valve, the assembly forms part of the plunger assembly. In some embodiments, a first assembly and a second assembly are provided. The first assembly may comprise a standing valve and form part of the barrel assembly and the second assembly may comprise a traveling valve and form part of the plunger assembly.

At block 904, fluid is flowed through the assembly. The fluid may comprise fluids received into the wellbore from the subterranean formation including, for example, hydrocarbons. The fluid may flow uphole through the apparatus and into the flow cage of the valve. In embodiments in which both a first and second assembly are provide at block 902 above, the fluid flows uphole through the apparatus and standing valve of the first assembly on the upstroke of the plunger assembly and through the apparatus and traveling valve of the second assembly on the downstroke.

The method 900 may also include performing any other operational steps or functions of the system described herein.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An apparatus for a downhole pump, the apparatus comprising:
  a body having an uphole end and a downhole end, the body comprising:
    an outer circumferential wall;
    an inner core positioned at a longitudinal axis of the body, the inner core comprising an elongate element having an upper domed end and a convex lower domed end; and
    at least two fluid channels extending through the body between the elongate element and the outer circumferential wall, the at least two fluid channels spaced circumferentially around the elongate element.

2. The apparatus of claim 1, wherein the at least two fluid channels comprise three fluid channels.

3. The apparatus of claim 1, wherein each of the at least two fluid channels has an approximately obround horizontal cross-section.

4. The apparatus of claim 1, wherein each of the at least two fluid channels comprises a respective upper opening and a respective lower opening, and wherein the respective upper opening is a fluid outlet and the respective lower opening is a fluid inlet.

5. The apparatus of claim 4, wherein the respective lower opening is rotationally offset from the respective upper opening.

6. The apparatus of claim 5, wherein each of the at least two fluid channels extends from the respective upper opening to the respective lower opening in an approximately helical path around the circumference of the elongate element.

7. The apparatus of claim 1, wherein the upper domed end is approximately semi-elliptical in profile.

8. The apparatus of claim 1, wherein the convex lower domed end is approximately semi-circular in profile.

9. The apparatus of claim 1, wherein the upper domed end of the elongate element is the uphole end of the body.

10. The apparatus of claim 1, wherein the body further comprises an upper chamber at the uphole end, and wherein the upper domed end of the elongate element is recessed within the upper chamber.

11. The apparatus of claim 1, wherein the body further comprises a lower chamber at the downhole end, and wherein the convex lower domed end of the elongate element is recessed within the lower chamber.

12. The apparatus of claim 11, wherein the lower chamber is approximately frusto-conical in shape.

13. The apparatus of claim 1, wherein the body comprises an upper attachment section attachable to a flow cage of a valve.

14. The apparatus of claim 1, wherein the body comprises a lower attachment section attachable to another downhole component.

15. An assembly for a downhole pump comprising:
  a valve comprising a flow cage, a valve ball, the valve ball received within the flow cage; and
  an apparatus positioned below the valve ball, the apparatus comprising:
    a body having an uphole end and a downhole end, the body comprising:
      an outer circumferential wall;
      an inner core positioned at a longitudinal axis of the body, the inner core comprising an elongate element having an upper domed end and a convex lower domed end; and
      at least two fluid channels extending through the body between the elongate element and the outer circumferential wall, the at least two fluid channels spaced circumferentially around the elongate element.

16. The assembly of claim 15, wherein the apparatus is coupled to the flow cage.

17. The assembly of claim 15, wherein the valve further comprises a ball seat positioned below the valve ball within the flow cage, and wherein the body of the apparatus is partially received into the flow cage to abut the ball seat.

18. A method for altering fluid flow in a downhole pump, the method comprising:
  providing at least one assembly comprising:
    a valve comprising a flow cage, a valve ball, the valve ball received within the flow cage; and
    an apparatus positioned below the valve ball, the apparatus comprising:
      a body having an uphole end and a downhole end, the body comprising:
        an outer circumferential wall;
        an inner core positioned at a longitudinal axis of the body, the inner core comprising an elongate element having an upper domed end and a convex lower domed end; and
        at least two fluid channels extending through the body between the elongate element and the outer circumferential wall, the at least two fluid channels spaced circumferentially around the elongate element; and
  flowing fluid through the at least one assembly.

19. The method of claim 18, wherein providing the at least one assembly comprises providing a first assembly and a second assembly.

20. The method of claim 19, wherein the valve of the first assembly is a standing valve and the valve of the second assembly is a traveling valve.

* * * * *